Figure 1:
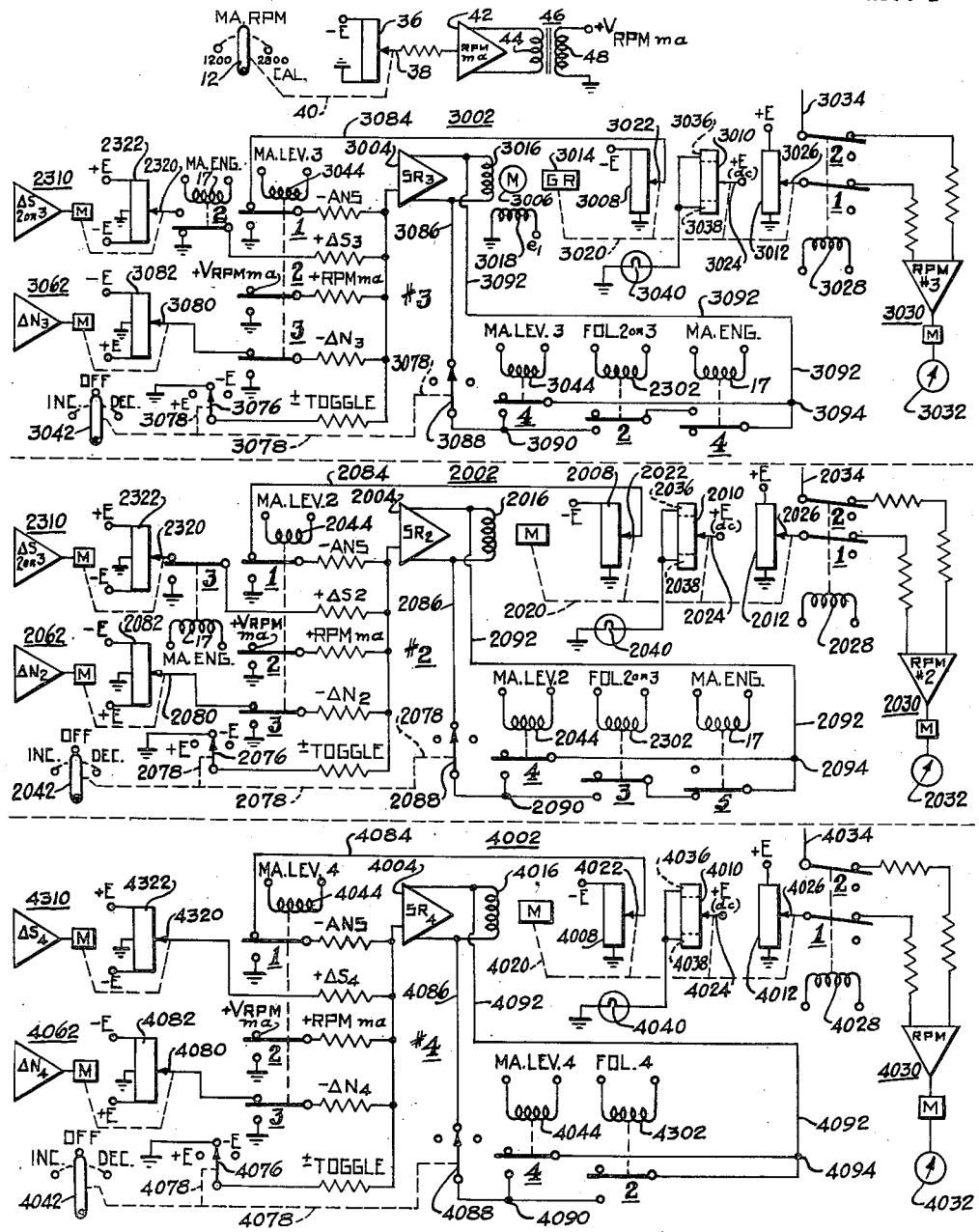

Sept. 6, 1960 R. H. GOODWIN 2,951,298
PROPELLER SIMULATING SYSTEM FOR AIRCRAFT TRAINERS
Original Filed July 22, 1954 5 Sheets-Sheet 5

INVENTOR.
ROSCOE H. GOODWIN
BY Norbert Ederer
HIS ATTORNEY

United States Patent Office 2,951,298
Patented Sept. 6, 1960

2,951,298
PROPELLER SIMULATING SYSTEM FOR AIRCRAFT TRAINERS

Roscoe H. Goodwin, Allendale, N.J., assignor to Curtiss-Wright Corporation, a corporation of Delaware Continuation of application Ser. No. 445,090, July 22, 1954. This application July 18, 1957, Ser. No. 672,750

17 Claims. (Cl. 35—12)

This invention relates to aircraft trainers and more particularly to apparatus for simulating r.p.m. control, synchronizing and related control functions and operation of a well-known type of aircraft propeller.

This application is a continuation of my copending application S.N. 445,090, filed July 22, 1954, now abandoned.

Multiple engine aircraft such as the C-119 (military designation) and the DC-6 (commercial designation) include a well-known propeller of the variable pitch constant speed type having hydraulically operated means which determine propeller pitch according to the setting of an engine governor. Electrical control means set the governor of each engine according to a preselected r.p.m. and the pitch of the propeller is determined accordingly. The r.p.m. and propeller pitch for the various engines of the aircraft may be changed simultaneously by means of a master control lever, or alternatively may be regulated separately by toggling switches.

An electric system controls synchronization of the propellers and such synchronizing system provides for the selection of one engine of the aircraft to operate as a master engine at a predetermined r.p.m. as selected by the pilot, with the r.p.m. of the other engines being controlled according to the master engine r.p.m. Accordingly, an electric generator is provided for each engine for producing a control voltage having a frequency determined by the r.p.m. of the engine, and synchronizing and control equipment is provided for comparing and for utilizing the signals from the generator of the master engine and the other generators in such a manner that the other engines function as slaves in relation to the master engine. The synchronizing system is so designed for a four engine aircraft as the DC-6 such that either one of two engines may be selected as a master engine for the other engines to follow.

A mechanical limiting device is incorporated into the synchronizing system for limiting the amount of control which the master engine has over the slaves, such that in the event the master engine fails, the slave engines will nevertheless remain effective. By reason of such limiting device the slave engines will follow changes in the master engine r.p.m. for only about ±3% of their speed. If the slave engines are out of synchronization by more than about ±3% they can normally be brought within the master engine's range by working toggle switches of the stray slaves. However, to make it easier, means including a resynchronizing button are provided whereby each push of such button provides for a 3% return of all stray slaves. The resynchronizing button is pushed as many times as may be necessary to bring the slaves into synchronization with the master engine.

The propeller controls usually installed on the flight engineer's main instrument panel includes the master control lever by means of which the r.p.m. of all engines can be changed simultaneously, toggle switches corresponding in number to the number of engines for controlling the r.p.m. of the engines individually, a synchronizing switch for turning the synchronizing system on or off and for selecting the master engine in a four engine aircraft, the resynchronizing button, and r.p.m. limit lights for indicating to the pilot when the engine governors are set at maximum or minimum r.p.m. positions.

In accordance with the present invention the described r.p.m. control and synchronizing systems are realistically simulated by novel coordinated electrical computing means and control apparatus so that aircraft personnel can obtain on the ground by the use of this invention complete and thorough training in the operation of such systems.

The invention will be more fully set forth in the following description referring to the accompanying drawings, and the features of novelty will be pointed out with particularity in the claims annexed to and forming a part of this specification.

In the drawings and specification the invention is shown and described as applied to a four engine aircraft of the DC-6 type in which either one of two engines, called master-follower engines, may be selected as the master engine whereupon all other engines including the other master-follower engine become slaves. For the purpose of simplifying the drawing and specification simulated propeller r.p.m. control and synchronizing apparatus is shown and described only for three engines, the number 2, 3 and 4 engines of the aircraft, engines 2 and 3 being master-follower engines each of which can be utilized as either a master or follower engine, and the other engine, the number 4 engine, being an engine which functions only as a slave in the synchronizing of the propellers. The propeller r.p.m. control and synchronizing apparatus for engine 1 which is a follower engine is identical with the apparatus for engine 4, and therefore need not be separately considered.

Figure 2:
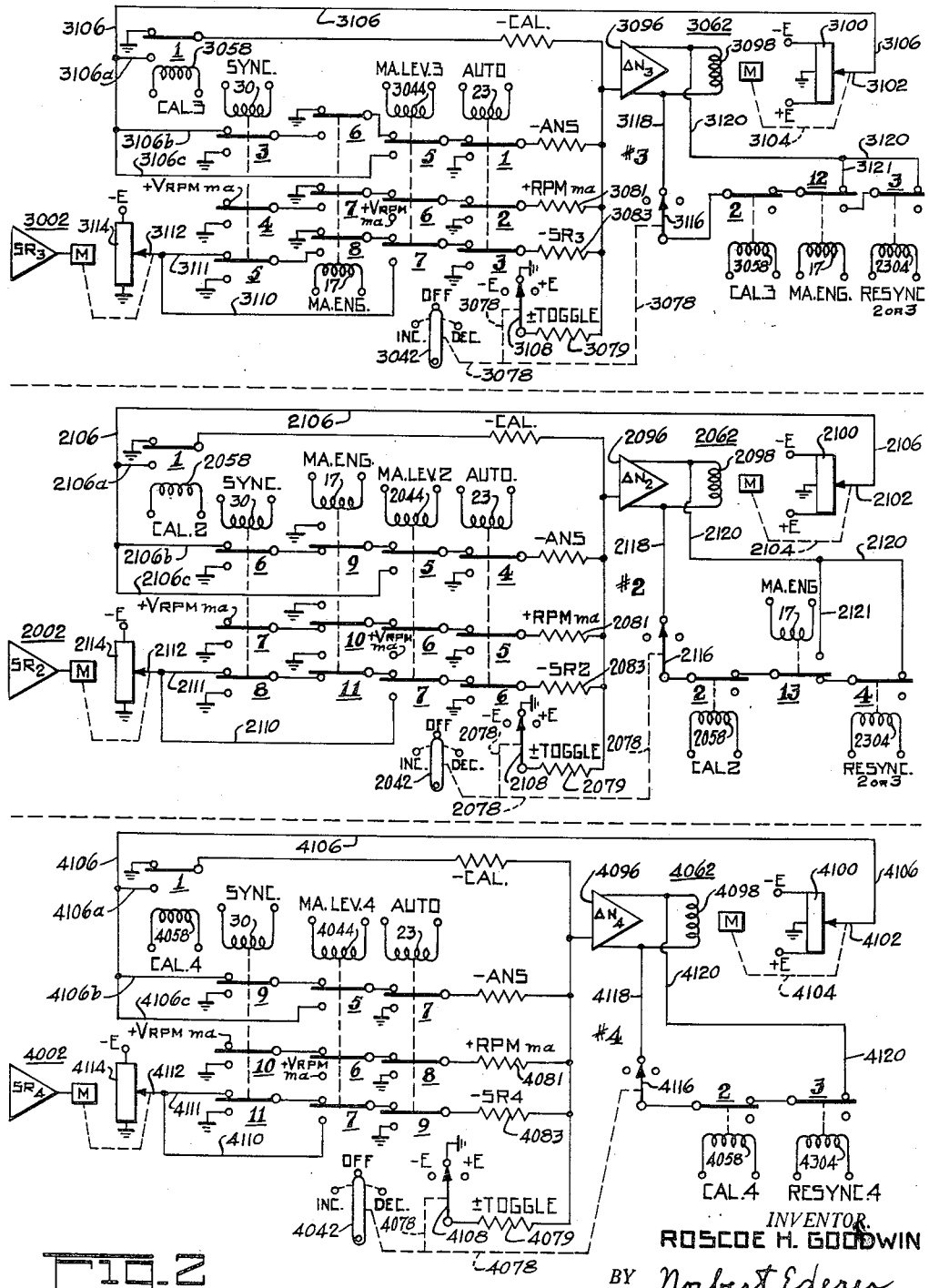
Figure 3:
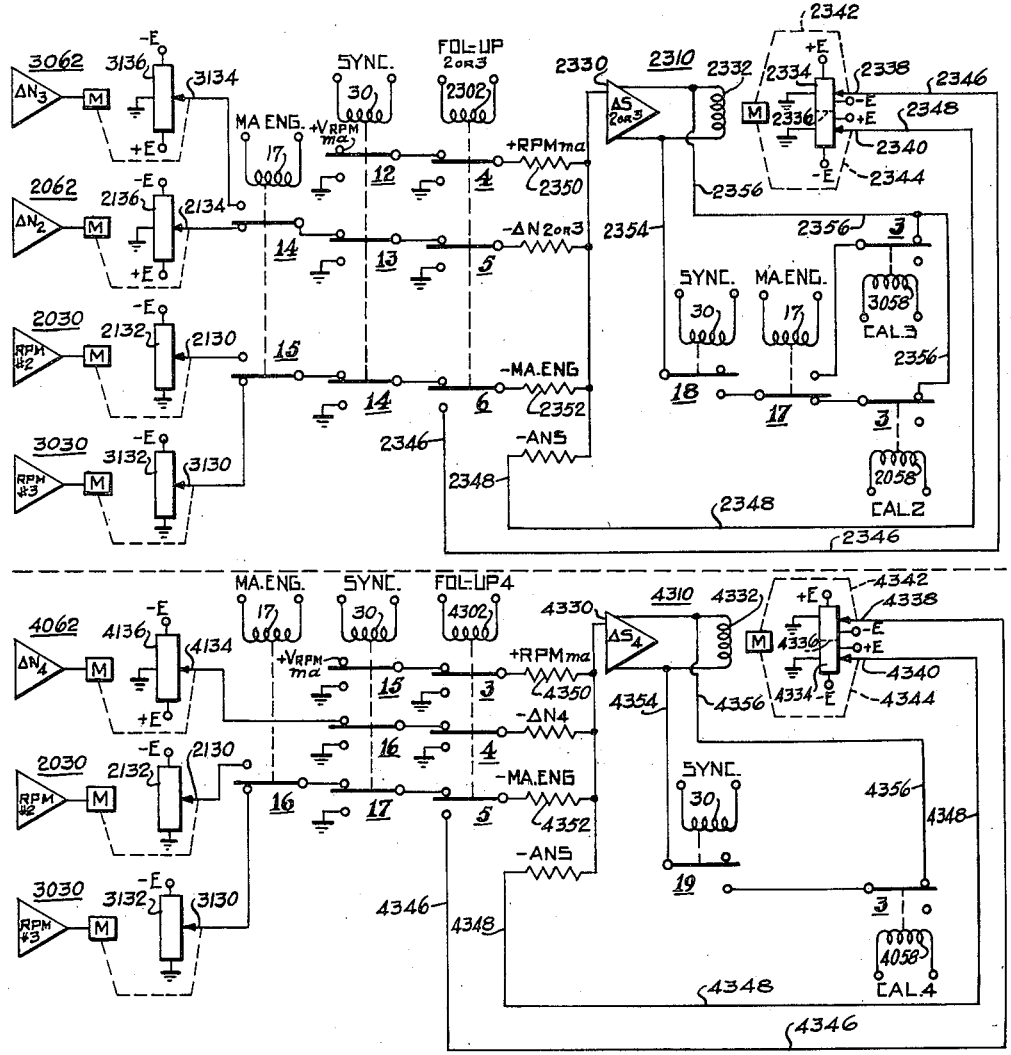
Figure 4:
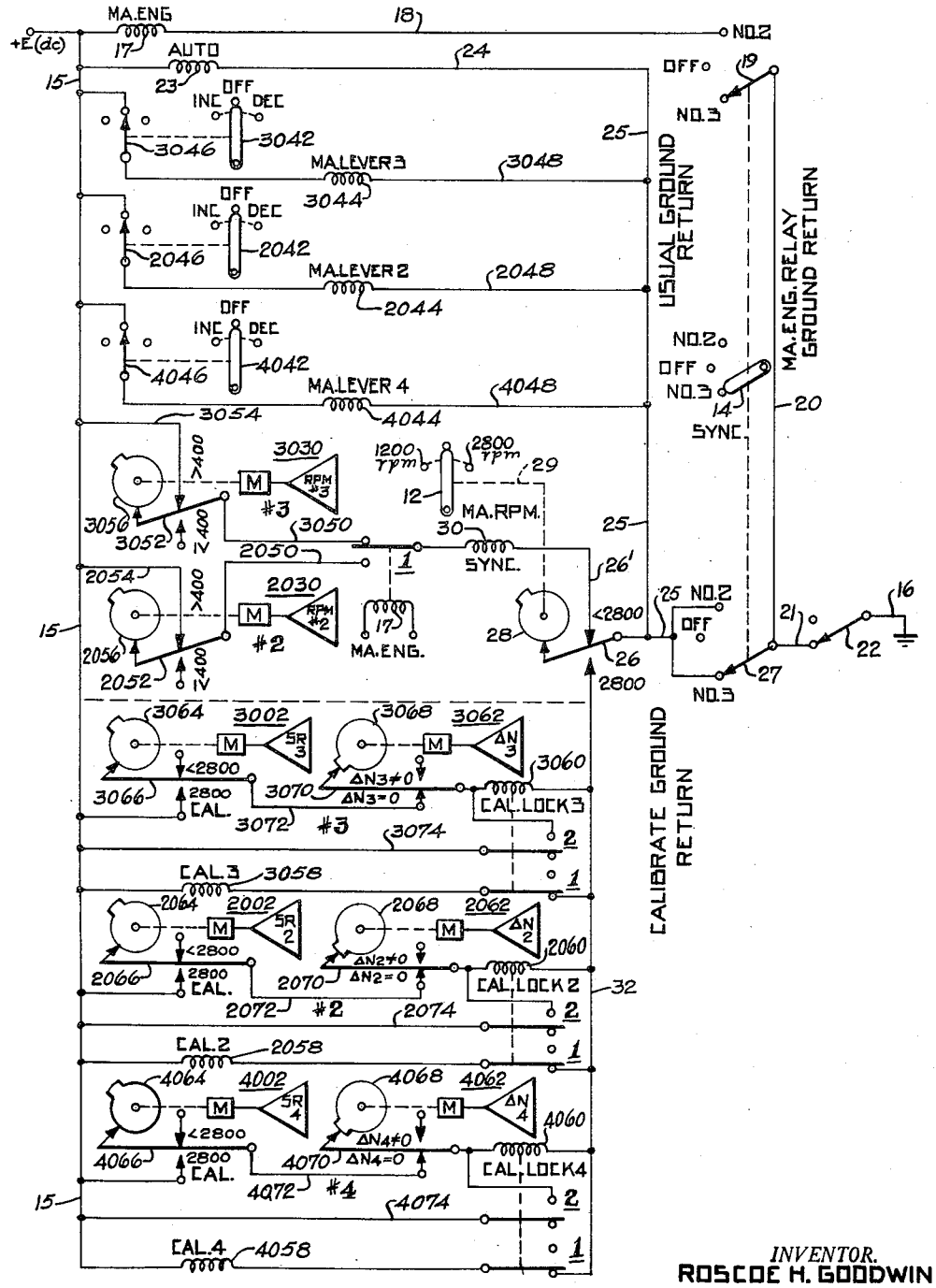
Figure 5:
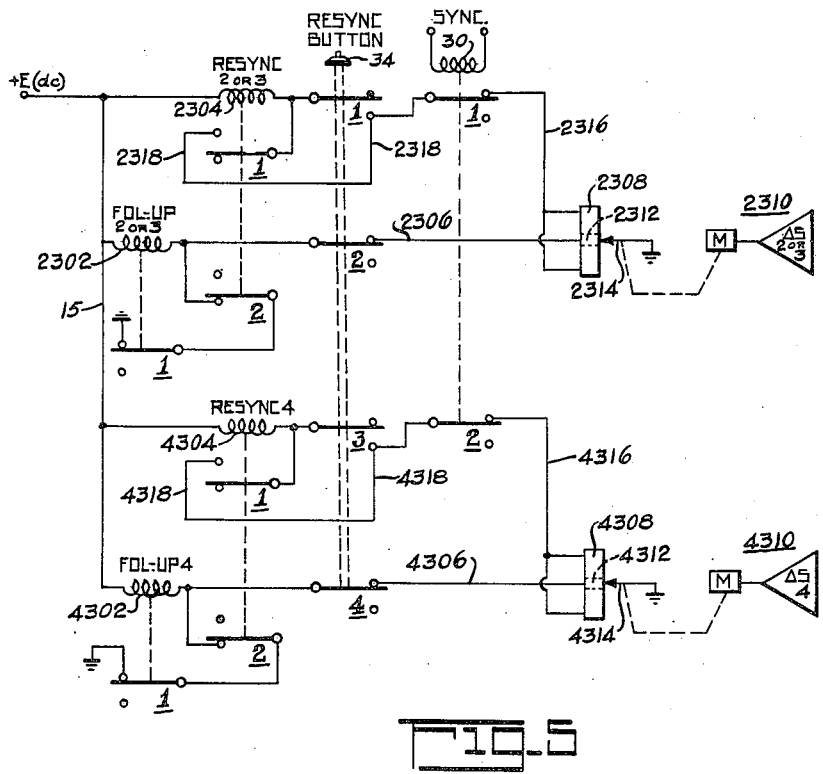

In the drawings Fig. 1 is a partly diagrammatic and schematic illustration of a portion of the simulated propeller r.p.m. control and synchronizing apparatus comprising speeder rack servo (SR) with circuitry for controlling its operation for each engine system;

Fig. 2 is a similar illustration of another portion of the simulated propeller r.p.m. control and synchronizing apparatus including a toggle servo (ΔN) with control circuitry for each engine system;

Fig. 3 is a similar illustration of another portion of the simulated propeller r.p.m. control and synchronizing apparatus comprising a band limit servo (ΔS) and control circuitry for each slave engine system (not including the No. 1 engine); and Figs. 4 and 5 are illustrations of portions of the simulated propeller r.p.m. control and synchronizing apparatus including control relay energization circuitry common respectively to all engine systems and to the two slave engine systems (not including the No. 1 engine) only.

As will be seen hereinafter the speeder rack or governor servos function according to various control factors to simulate the operation of governor means in the aircraft determining the r.p.m. of the engine. Each toggle servo is effective upon "toggling," i.e. individual speed control of its particular engine, to maintain its speeder rack servo in position corresponding to the new desired speed and prevent the return of such speeder rack servo to its initial position before toggling. The band limit servos which are associated with only such engines as are or operate as slave engines (follower engines), are effective to limit the band or range of syncronization of respective associated speeder rack servos with the master speeder rack servo to about ±3% as previously stated.

In the drawings a number of simplifying conventions have been adopted to facilitate tracing of the circuitry and to avoid unnecessary and confusing repetition of description of such structure as is the same in each of the systems corresponding to the No. 2, No. 3, and No. 4 engines. Referring to Fig. 1 for example, it is noted that the parts of the engine No. 3 system are identified by a four digit reference numeral, whose thousands digit is three, and the corresponding parts in the engine No. 2 and engine No. 4 systems are identified by corresponding reference numerals whose thousands digits are two and four respectively. In considering the systems, reference is explicitly made to the parts of the engine No. 3 system, but the corresponding parts of the engine No. 2 and engine No. 4 systems should be considered simultaneously. As stated previously, the No. 2 and No. 3 engines are master-follower engines whereas the No. 4 engine (and also the No. 1 engine not described herein) are slave engines. The No. 3 engine may be assumed for the time begins to be the master engine, so that the No. 2 engine behaves as a slave engine much like the No. 4 engine. The structure of the No. 3 engine system will be described at great length, but the structure of the No. 2 and No. 4 engines will be described only to the extent necessary to point out distinctions from the structure of the No. 3 engine. The interdependence of operation of all engine systems will be described in great detail. Other parts of the drawings, common to two or possibly all three of the described engine systems, will be identified by reference numerals having less than four digits or by appropriate letters, as will appear hereinafter.

In Fig. 1 of the drawings, reference character 3002, designates the speeder rack servo (SR$_3$) for the No. 3 master engine. Speeder rack servo 3002 is typical of other servo systems shown in the drawings. Referring to the speeder rack servo 3002 as an example, such servo includes a servo amplifier 3004 to which are applied a number of control voltages, a motor 3006 responsive to the amplifier output, and a number of potentiometers including an answer card 3008 and other potentiometer cards as for example 3010 and 3012 having slider contacts connected through a gear reduction box 3014 to the motor. Servo amplifier 3004 is a summing amplifier for determining the resultant of the input voltages, and is of a type well-known in the art for algebraically summing a plurality of A.C. voltages of varying magnitude and polarity. A detailed circuit illustration of the servo amplifier is therefore unnecessary.

For purposes of simplicity the motors of various servos in the system have in places been diagrammatically illustrated by means of a rectangle inclosing the letter M. Motor 3006 is of the two-phased type, the control phase 3016 of which is energized by the amplifier output as illustrated, the other phase 3018 being energized by a constant reference A.C. voltage $e_1$ de-phased 90° from the control voltage. The operation of this type of motor is well-known, rotation being in one direction when the phase difference between control and reference voltages of the respective phases is +90°, and in the opposite direction when such phase difference is −90°. The rate of rotation in both cases depends on the magnitude of the control voltage.

It should be understood that the motors used herein generally are at a standstill. They rotate responsive to a change in a control signal applied from some point external to the associated servo amplifier and even then rotate only for a short time interval until the change in the external input signal has been rebalanced. Rebalance is due to a change in magnitude and/or reversal of phase of a negative feedback type or answer signal, designated as −ANS or −CAL which said change in magnitude and/or reversal in phase tends to oppose the effect of further rotation due to the change in the external input signal. The answer signal is generated continuously in accordance with the instantaneous position of the servo motor and as such is applied also to the input of the associated servo amplifier. Because the answer signal is generated within the servo system in question it will also be referred to as an internal input signal as distinguished from the aforesaid external input signal.

Except for the aforesaid A.C. voltage $e_1$, all A.C. voltages used herein are either in phase with or in phase opposition to another A.C. reference voltage +E. Still another A.C. reference voltage −E is also provided and is of equal magnitude but in phase opposition to the reference voltage +E. Only one D.C. voltage is used in the system and this is identified as +E (D.C.). It is employed chiefly for energization of relays. Therefore all voltages other than this voltage +E (D.C.) may be assumed to be A.C. voltages of the same line frequency, even though not so explicitly identified or labeled, and their in-phase or phase opposition to the reference voltage +E is indicated by a plus sign or a minus sign respectively.

The motor 3006 serves to operate through gear reduction box 3014 and suitable mechanical connections indicated by dotted line 3020 contacts 3022, 3024 and 3026 of potentiometers 3008, 3010 and 3012 respectively. The potentiometer resistance elements such as 3008 of the speeder rack servo (SR$_3$) and other potentiometers indicated in the drawing may be of the well-known wound card type and are of circular band form in practice, but are diagrammatically illustrated in plane development for clarity. A structural arrangement that may be conveniently used for a servo motor and potentiometer combination of the character above referred to is shown in Patent No. 2,431,749, issued December 2, 1947, to R. B. Grant for "Potentiometer Housing and Positioning Structure."

It will be apparent that operation of the servo motor in either direction causes the gang operated potentiometer slider contacts, such as slider contact 3022 to move to corresponding angular positions on the respective potentiometer elements for deriving, i.e. picking off potentiometer voltages depending on the respective contact position. Each potentiometer of each servo system is shaped or contoured and designed with suitable shunting resistances as required so that the value of the derived voltage at the potentiometer contact bears a certain relationship to linear movement of the slider contact depending upon the particular function of the potentiometer, and has an A.C. voltage impressed across its terminals depending as to instantaneous polarity and magnitude also upon the function of the potentiometer.

The speeder rack servo (SR$_3$) has slider contact 3026 of its potentiometer 3012 connected over the normally closed (NC) contact 1 of engine seize relay 3028 with an input of an r.p.m. servo 3030 associated with the engine No. 3 system whereby operation of the r.p.m. servo may be controlled by the SR$_3$ servo. Potentiometer card 3012 has one end grounded and the other end supplied by the reference voltage +E. As shown the r.p.m. servo controls an r.p.m. indicator 3032 which registers simulated engine r.p.m. of engine No. 3. The SR$_3$ servo functions between limits representing the limits of governor regulation, namely 1200 r.p.m. and 2800 r.p.m., and the r.p.m. registered on the r.p.m. indicator 3032 is dependent at any particular time upon the SR$_3$ servo position except on infrequent occasions as for example when the apparatus is operated to simulate the condition of insufficient power being available to maintain an engine r.p.m. corresponding to a maximum governor setting, or a condition of engine seizure. Means are provided for supplying the r.p.m. servo with an input over line 3034 when required for taking into account the described condition of insufficient power being available, but such means do not constitute a part of my invention and are therefore not shown. The relay 3028 which may be controlled by an instructor in any suitable manner simulates engine seizure by eliminating inputs to the r.p.m. servo by opening the NC contact 2 in line 3034 when the relay picks up thereby causing the r.p.m. servo to run to a zero reading.

Potentiometer 3010 of the SR₃ servo has conducting portions only at opposite ends 3036 and 3038 which connect with an indicating lamp 3040 and thence to ground. A circuit is complete for the lamp 3040 only when the slider contact is positioned at one or other of the ends of card 3010 corresponding to one of the limiting positions for the SR₃ servo representing a governor setting of 1200 r.p.m. or 2800 r.p.m. respectively. At such time the supply voltage +E (D.C.) is connected to the circuit for the lamp 3040 which lights to indicate a maximum or minimum governor setting. It is apparent that card 3010 even though outwardly appearing as a potentiometer, actually operates as a switch to open and close a lighting circuit for lamp 3040.

Inasmuch as many of the inputs to the SR₃ servo as well as to the other servos are applied through relay contacts, the energization circuits for these relays and the conditions precedent for their energization will be discussed next. The energization paths for these relays (hereinafter referred to collectively as internal control relays as distinguished from the engine seize relays) are illustrated in Figs. 4 and 5. Referring to Fig. 4 there are shown, in simulation of the controls in an actual aircraft, a master r.p.m. control lever 12, a synchronization switch 14, and toggle levers 3042, 2042 and 4042, the toggle levers being associated respectively with the No. 3, No. 2 and No. 4 engine systems. The synchronization switch 14 is a 3-position switch and has two on-positions corresponding to the selection of the No. 2 or the No. 3 engine as the master engine, and a center-off-position. When switch 12 is placed in its center off-position, synchronization of the slave engines with the master engine is precluded. If synchronism were to be maintained even though the synchronization switch 12 is in its center off-position, the individual toggle levers 3042, 2042 and 4042 would have to be operated.

The master r.p.m. control lever 12 is continuously operable between two limits corresponding to engine governor settings of 1200 r.p.m. and 2800 r.p.m. The upper limit 2800 r.p.m. is also referred to as the "calibrate" position for reasons that will be apparent hereinafter. The toggle levers are 3-position switches and are usually positioned in a center off-position. The effect of switching a toggle lever to the left-hand position (as viewed in the drawings) is to increase the r.p.m. of the associated engine and conversely the effect of switching the toggle lever to the right-hand position is to decrease such r.p.m.

The energization paths for the internal control relays shown in Fig. 4 extend from the +E (D.C.) line 15 to a ground line 16. The energizing circuit for a master engine relay 17 extends from the +E (D.C.) line 15; through the relay coil; over line 18 to a contact 19 gang-operated with the synchronization switch 14; then, assuming that the No. 2 engine has been selected as master engine, through contact 19 over lines 20 and 21 and through a usually closed synchronization fail contact 22 to ground. Contact 22 is usually closed but may be opened by the instructor to simulate synchronization failure in which case its effect is the same as though the synchronization switch 14 were placed in its center off-position. For convenience in terminology the contact 19 in its No. 2 position, lines 20, 21 and the synchronization fail contact 22 in its usually closed position will be collectively referred to as the "master engine relay ground return."

Automatic relay coil 23 has one end connected to the +E (D.C.) line 15 and its other end is connected over lines 24 and 25, a contact 27 gang-operated with the synchronization switch 14 provided such contact 27 is in either the engine No. 2 or engine No. 3 position, line 21, and usually closed synchronization fail contact 22 to ground. For convenience in terminology line 25, the switch 27 in either the engine No. 2 or No. 3 position, line 21 and the contact 22 in its usual position will be collectively referred to as the "usual ground return." This is the ground return under usual synchronized operating conditions, which presuppose that the engines are in synchronism and operate at some speed less than 2800 r.p.m. but no less than 1200 r.p.m., and that the entire system including control lever 12 has been "calibrated." In such case the lever 12 operates indeed as a calibrated indicating device whose position reflects the r.p.m. of each engine. It is also possible to synchronize the engines by operation of toggle levers, but in such case the position of lever 12 no longer reflects engine r.p.m. and calibration in that sense is lost.

The three master lever relays 3044, 2044 and 4044 may be considered together in much the same manner as the three speeder rack servos have been considered together. Only the relay 3044 of the No. 3 engine system is expressly described, the other being implicitly described by correspondence of reference numerals. The energization path for the No. 3 master lever relay 3044 extends from the +E (D.C.) line 15; then, assuming the toggle lever 3042 is in its center off-position, through a contact 3046 gang-operated therewith, through the relay coil and over line 3048 to the usual ground return. As will be apparent hereinafter under usual synchronized operating conditions the three toggle levers 3042, 2042 and 4042 are in fact in the center off-position. The remaining internal control relay which is energized over the usual ground return, is a synchronizing relay 30 whose energization depends on the position of the control lever 12. Energization of relay 30 is possible only if lever 12 is in a position corresponding to an r.p.m. less than the 2800 r.p.m. of the calibrate position. The lever 12 operates a cam 28 by means of connections indicated as 29, and the cam 28 operates a contact 26 to open and close the energization circuit for relay 30. The path extends (reversing the previous order) from the usual ground return, over the cam-operated contact 26 which is usually in the position as shown in the drawing to connect to line 26′, over such line 26′, through the relay coil and through either the normally closed (NC) or the normally open (NO) contact 1 of the master engine relay 17 depending on selection of the No. 3 or No. 2 engines as master engine respectively. "Normalcy" as used herein with reference to relay contacts follows the customary convention of the state of such contacts were all sources of relay energization disconnected. The alternative paths from either the NC contact 1 or NO contact 1 of the master engine relay 17 are closely analogous and can be traced simultaneously, even though only the former is explicitly described, by recognizing the correspondence of reference numerals. The path from the NC contact 1 extends over a line 3050 to a cam operated contact 3052, then over the line 3054 to the +E (D.C.) line 15. The contact 3052 is operated by means of a cam 3056, which in turn is gang-operated by the No. 3 RPM servo 3030 previously described. The contact 3052 is usually connected to line 3054 corresponding to an r.p.m. of the No. 3 engine, as computed by servo 3030, of greater than 400 r.p.m. For an engine speed of 400 r.p.m. or less which corresponds to engine stalling, the cam 3056 operates to open the connection of 3052 thereby opening the energization circuit of the synchronizing relay 30.

In the event the master r.p.m. control lever 12 is positioned to the calibrate position of 2800 r.p.m. the connection of relay 30 to the usual ground return is opened by disconnection of the cam-operated contact 26 from line 26′ and as a consequence the synchronizing relay 30 is necessarily deenergized. The contact 26 is connected to line 32 instead. For convenience in terminology the path including line 32, contact 26 in its "unusual position," line 25, contact 27 provided it is either in the No. 2 or No. 3 position, line 21 and contact 22 to ground will be collectively referred to as the "calibrate ground return," corresponding to the master r.p.m. control 12 in the 2800 r.p.m. calibrate position. This calibrate ground return is so named because it is complete during calibration, i.e. with lever 12 in the 2800 r.p.m. calibrate position. This, as previously stated, calibrates the system in that thereafter the position of lever 12 indicates the r.p.m. of each engine.

Before considering the internal control relays which are or may be energized due to completion of the calibrate ground return, it is pointed out that the automatic relay, the three master lever relays 3044, 2044 and 4044 and the synchronizing relay 30 are "usually" energized. The automatic relay is usually energized because the usual ground return path is usually complete. The three master lever relays are usually energized for the same reason and for the further reason that their respective toggle levers are in the center off-position under usual synchronized operating condition. The synchronizing relay 30 is usually energized because the usual ground return is usually complete, the lever 12 is usually in a position corresponding to less than 2800 r.p.m., and the r.p.m. servos of the No. 2 and No. 3 systems are operating at greater than 400 r.p.m. With the No. 3 engine selected as the master engine by virtue of positioning of the synchronizing switch 12 in the No. 3 position, the master engine relay ground return is open and therefore the master engine relay 17 is necessarily deenergized. Arbitrarily the deenergized state of master engine relay 17 corresponding to selection of the #3 engine as master engine is also deemed as "usual," even though under usual synchronized operating conditions the #2 engine could as well be selected as master engine whence relay 17 would be energized.

The relays whose energization paths extend through the calibrate ground return include one calibrate relay and one calibrate lock relay for each engine system. Again the energization paths for the calibrate relay 3058 and for the calibrate lock relay 3060 of the engine No. 3 system will be explicitly described whereas the corresponding relays of the No. 2 and No. 4 systems will be recognized by correspondence of reference numerals. The energizing circuit for the calibrate relay 3058 extends from the +E (D.C.) line 15 through the relay coil and then over the NC contact $\underline{1}$ of the calibrate lock relay 3060 to the calibrate ground return. The immediate consequence of closing the calibrate ground return circuit due to positioning of the master r.p.m. lever 12 in the 2800 r.p.m. calibrate position is the energization of the calibrate relay 3058. As will be more fully explained hereinafter, after a short time delay the calibrate lock relay 3060 picks up and its NC contact $\underline{1}$ necessarily is opened, deenergizing the calibrate relay 3058. Thus the calibrate relays are energized only with the master r.p.m. control 12 in the 2800 r.p.m. calibrate position and even then only energized momentarily. With placement of the master r.p.m. control lever 12 in the 2800 r.p.m. calibrate position, the $SR_3$ servo 3062 will run to a position corresponding to 2800 r.p.m. whereas the toggle servo of the engine No. 3 system ($\Delta N_3$) generally indicated as 3062 will assume a center position defined as undeflected zero, unless it is already initially at such undeflected center position. As will be more fully explained hereinafter the undeflected zero position is the usual position of the toggle servos, prevailing under usual synchronized operating conditions.

A cam 3064 is operated by the $SR_3$ servo to operate a contact 3066 usually so as to cause its disconnection from line 15, but to cause connection therewith when the $SR_3$ servo is in its 2800 r.p.m. calibrate position. A cam 3068 is operated by the $\Delta N_3$ servo 3062 to operate a contact 3070 usually so as to cause its connection to a line 3072 connected to contact 3066 in the undeflected zero position of the $\Delta N_3$ servo, but to cause disconnection therefrom otherwise. With closure of contact 3070, either attendant to the $\Delta N_3$ assuming its undeflected zero position due to positioning of the master r.p.m. control 12 in the 2800 r.p.m. calibrate position, or because the $\Delta N_3$ servo was in its undeflected zero position even prior to positioning of the control 12, and with the closure of contact 3066 due to the $SR_3$ servo having run to its 2800 r.p.m. position, the energization path for the calibrate lock relay 3060 is completed. The path extends from the +E (D.C.) line 15, contact 3066, line 3072, contact 3070 and the relay coil to the calibrate ground return. Its NC contact $\underline{1}$ opens to open the energization circuit for the calibrate relay 3058 which thereafter remains deenergized. A hold circuit for the calibrate lock relay 3060 is established from the +E (D.C.) line 15 over line 3074, its NO contact $\underline{2}$, and through the relay coil to the calibrate ground return. Thereafter the calibrate lock relay remains energized until the calibrate ground return is opened once more as for example by shifting the master r.p.m. control from the 2800 r.p.m. calibrate position.

The energization paths for the remaining internal control relays are shown in Fig. 5 and have ground returns unconnected to the three previously described ground returns. The relays and associated circuitry shown in Fig. 5 are associated with the slave engines only, i.e. the No. 4 engine system and either the No. 2 or the No. 3 engine, whichever is selected as slave engine. As previously stated it is assumed for the time being that the No. 3 engine is the master engine and the No. 2 engine is a slave engine as indicated by the position of the synchronizing switch 14 in Fig. 4. In Fig. 5 as well as in the other figures, a part associated with either engine 2 or engine 3, whichever is selected as slave engine, is identified by a four digit reference numeral whose thousands digit is two and whose hundreds digit is three whereas the corresponding part in the engine No. 4 system is designated by a four digit reference numeral whose thousands digit is four and whose hundreds digit is three, the remaining digits being in correspondence. The circuitry of the No. 2 or 3 system and the No. 4 system is to be considered simultaneously although expressly described only for the No. 2 or 3 system. The No. 4 system is recognized by the correspondence of the reference numerals.

Each of the slave systems is provided with a follow-up relay and a resynchronizing relay which operate to some extent as a bistable pair in that the follow-up relay is usually energized and the resynchronizing relay is usually deenergized. Considering the No. 2 or 3 system in Fig. 5 expressly and the corresponding No. 4 system by correspondence of reference numerals, the follow-up relay for the No. 2 or 3 system is designated by reference numeral 2302 and its resynchronizing relay is designated by reference numeral 2304. In simulation of the actual aircraft there is provided a resynchronizing button 34 which is shown in its usual undepressed position, and is provided with four contacts operated with the resynchronizing button 34 in unison to alternately usually closed and usually open positions. The energizing circuit for the follow-up relay 2302 extends from the +E (D.C.) line 15, through the relay coil, through the usually closed contact $\underline{2}$ of the resynchronizing button 34, over line 2306 to the center portion of a potentiometer card 2308 which is operated according to the position of the $\Delta S_{2\ or\ 3}$ band limit servo 2310. The central portion 2312 of card 2308 is insulated from the remaining portions of said card, which remaining portions are connected in the energization circuit of the resynchronizing relay 2304 as explained hereinafter. The grounded slider 2314 of card 2308 is usually positioned to contact the central portion 2312 corresponding to the center position of the $\Delta S_{2\ or\ 3}$ servo defined as the undeflected zero position as in the case of the toggle servos previously discussed. Slider 2314 therefore usually completes the energization circuit for follow-up relay 2302 to ground. It is apparent that the card 2308 although appearing as a potentiometer acts in effect as a switch to connect the energization circuit of either follow-up relay 2302 or the resynchronizing relay 2304 to ground.

Upon energization of the follow-up relay 2302 a hold circuit is established therefor through the NC contact $\underline{2}$ of the resynchronizing relay 2304 and through its own grounded NO contact $\underline{1}$. In Fig. 5 the follow-up relay 2302 is represented as energized, whereas the resynchronizing relay 2304 is represented as deenergized. Such representation is intended to indicate the state of energization or deenergization under usual synchronized operating conditions and is also used for the relays shown elsewhere in the drawings to reflect their usual state of energization or deenergization as a further aid in interpreting the drawings.

The resynchronizing relay 2304 is usually deenergized because the slider 2314 is usually positioned in the central portion 2312 of card 2308. It will pick up only if said slider 2314 is positioned off-center corresponding to the $\Delta S_{2 \text{ or } 3}$ servo being deflected from its zero position, the usually energized synchronizing relay 30 is energized, and the resynchronizing button 34 is depressed either momentarily or continuously. Unless all three conditions are satisfied at least initially, the resynchronizing relay 2304 will remain deenergized and as a necessary consequence the follow-up relay 2302 will remain energized. Assuming that the three conditions precedent for the energization of the resynchronizing relay 2304 are satisfied, an energization path therefor is completed from the +E (D.C.) line 15 through the relay coil, through the NO contact $\underline{1}$ of the resynchronizing button 34, through the NO contact $\underline{1}$ of the synchronizing relay, and then over line 2316 through the off-center portions of card 2308 and slider 2314 to ground. Once the resynchronizing relay 2304 picks up, whether due to momentarily or continuous depressing of the resynchronizing button, a hold circuit is established therefor from the +E (D.C.) line 15, through the relay coil, through its NO contact $\underline{1}$, over line 2318 through the NC contact $\underline{1}$ of usually energized synchronizing relay 30, then over line 2316 through the off-center portions of card 2308 and slider 2314 to ground. The resynchronizing relay 2304 will become deenergized once more if the synchronizing relay 30 is deenergized or the slider 2314 is repositioned at undeflected zero. In the latter case of course the follow-up relay 2302 is energized once more provided the resynchronizing button 34 has been released again.

The description of the input circuitry of the speeder rack servos in Fig. 1 will now be resumed. Again the SR$_3$ servo circuitry will be described completely and the other speeder rack servos should be considered simultaneously having due regard to the correspondence of the reference numerals as previously explained. The amplifier 3004 of the SR$_3$ servo is supplied through respective summing resistors with four external input signals $+\Delta S_3$, $-\Delta N_3$, $+V_{RPM_{ma}}$, $\pm$TOGGLE and with an internal answer signal $-$ANS. The main input signal to the SR$_3$ servo is the voltage $+V_{RPM_{ma}}$ which is applied to the $+$RPM$_{ma}$ input through the NO contact $\underline{2}$ of usually energized master lever relay 3044. As will be seen the input signal $+V_{RPM_{ma}}$ principally controls the position of the SR$_3$ servo between an upper limit of 2800 r.p.m. and a lower limit of 1200 r.p.m. The circuitry for generating the voltage $+V_{RPM_{ma}}$ is shown in the upper portion of Fig. 1. A potentiometer card 36, whose one end is supplied by the voltage $-$E and whose other end is grounded, has its slider 38 operated in accordance with the position of the master r.p.m. control lever 12 by means of the mechanical connections 40. The voltage at slider 38 is fed through a summing resistor to an amplifier 42, and as amplified fed through the primary 44 of a transformer 46 to the secondary 48 thereof. One end of the secondary is grounded whereas the voltage $+V_{RPM_{ma}}$ is derived from its other end. The voltage $+V_{RPM_{ma}}$ is maximum corresponding to the master r.p.m. control lever 12 in the 2800 r.p.m. calibrate position and is zero corresponding to the lower limit 1200 r.p.m. position of lever 12.

As stated the voltage $+V_{RPM_{ma}}$ is applied to the $+$RPM$_{ma}$ input of servo amplifier 3004 through the NO contact $\underline{2}$ of the usually energized master lever relay 3044. The $-$ANS and $-\Delta N_3$ signals are fed through NO contacts of the master lever relay 3044, namely contacts $\underline{1}$ and $\underline{3}$ respectively, so that the state of energization of the master lever relay 3044 is an important factor in determining the inputs to the servo amplifier. With relay 3044 deenergized the inputs $-$ANS, $+$RPM$_{ma}$, and $\Delta N_3$ are grounded through the respective NC contacts. Even with the relay 3044 energized under usual synchronized operating conditions, the input $-\Delta N_3$ is zero and as will be seen the inputs $+\Delta S_3$ and $\pm$TOGGLE are also zero, so that the input voltage $+V_{RPM_{ma}}$ to the amplifier input $+$RPM$_{ma}$ is the only effective external input to the servo amplifier.

The input $\pm$TOGGLE is usually grounded through a contact 3076 which is operable in three positions according to the position of the toggle lever 3042, to which it is connected by means of the connections 3078. In the usual center off-position of toggle lever 3042 contact 3076 is grounded, whereas in the increase and decrease position of the toggle lever 3042 the contact 3076 and therefore the input $\pm$TOGGLE is connected to the reference voltages $+$E and $-$E respectively.

The input $-\Delta N_3$ usually connects through the NO contact $\underline{3}$ of usually energized master lever relay 3044 to a slider 3080 of a potentiometer 3082 which is positioned by the $\Delta N_3$ servo. Card 3082 is energized at opposite ends by the reference voltage $+$E and $-$E and its center tap is grounded. The servo $\Delta N_3$ usually assumes its center undeflected zero position wherein the slider 3080 and therefore the input $-\Delta N_3$ to the servo amplifier 3004 is grounded as previously stated. Before considering the remaining external input $+\Delta S_3$ the derivation of the $-$ANS input will be considered because uniformly applicable to each of the three speeder rack servos, whereas the derivations of the inputs $+\Delta S_2$ to the SR$_2$ servo and $+\Delta S_4$ to the SR$_4$ servo differ somewhat from the derivation of the input $+\Delta S_3$ to the SR$_3$ servo.

The $-$ANS signal as stated, is derived through the NO contact $\underline{1}$ of usually energized relay 3044, line 3084 and slider 3022 of potentiometer card 3008, whose ends are connected to the reference voltage $-$E and to ground. The ground end of card 3008 corresponds to the lower limit speed of 1200 r.p.m. for governor operation as determined by the master r.p.m. control 12 in the 1200 r.p.m. limiting position. The other end of the card 3008 which is connected to the reference voltage $-$E corresponds to a position of the slider 3022 of 2800 r.p.m. as determined by the master r.p.m. control lever 12 in its other 2800 r.p.m. calibrate limiting position.

The input $+\Delta S_3$ is usually grounded through the NC contact $\underline{2}$ of usually deenergized master engine relay 17. On the other hand the input $+\Delta S_2$ of the SR$_2$ servo is connected through the NC contact $\underline{3}$ of the same usually deenergized master engine relay 17 to a slider 2320 of a potentiometer card 2322 which is energized at opposite ends by the reference voltages $+$E and $-$E and has a grounded center tap. Potentiometer 2322 is operated according to the position of the $\Delta S_{2 \text{ or } 3}$ servo. When the No. 2 engine is selected as the master engine by positioning the synchronizing switch 14 in the No. 2 position (Fig. 4), the respective connections of the $+\Delta S_3$ input to the SR$_3$ servo and the $+\Delta S_2$ input to the SR$_2$ servo are in effect inverted. Selection of the No. 2 engine results in energization of the master engine relay 17, whence the $+\Delta S_3$ input is connected through the NO contact $\underline{2}$ of the master engine relay 17 to the same slider 2320, whereas the $+\Delta S_2$ input is connected through the NC contact $\underline{3}$ of relay 17 to ground. Thus the band limit servo $\Delta S_{2 \text{ or } 3}$ supplies an effective input to the particular speeder rack servo which is associated with the master-follower engine operating as a slave engine, whereas the corresponding input to the master engine speeder rack servo is grounded. This is desired as the $\Delta S_{2 \text{ or } 3}$ servo under certain conditions discussed hereinafter operates to limit the band of synchronization of the slave engine with the master engine. On the other hand the band of synchronization of the master engine is not so to be limited. For the same reason the corresponding input $+\Delta S_4$ to the $SR_4$ servo is directly connected to the corresponding slider 4320 of a corresponding card 4322 operated in accordance with the $\Delta S_4$ servo without passing through any relay contacts, as the No. 4 engine is always a slave engine. However under usual operating conditions the slider 2320 and the corresponding slider 4320 are grounded in any event to the center tap of their respective potentiometer cards, as their respective band limit servos are in their center, undeflected zero positions as will be apparent hereinafter, irrespective of which engine is selected as the master engine. Therefore the input $+RPM_{ma}$ of each speeder rack servo is the only input which receives an external effective input signal under usual synchronized operating conditions, namely the same input signal $+V_{RPM_{ma}}$ as determined by the master r.p.m. control lever 12. Under usual synchronized operating conditions also the respective servo motors of the three speeder rack servos are free to move as will be apparent immediately hereinafter, and the sliders 3026, 2026 and 4026 of respective potentiometers 3012, 2012 and 4012 assume corresponding positions. This results in the same signal being fed to the respective r.p.m. servo and therefore in the same reading of the three respective indicators 3032, 2032 and 4032. This holds true over the entire effective governor range of from 1200 to 2800 r.p.m.; however certain special situations arise at the limits of 1200 r.p.m. and of 2800 r.p.m. At the limit of 1200 r.p.m. the respective indicator lights lamps 3040, 2040 and 4040 will light, as they will also light at the 2800 r.p.m. limit. Additional events occur at the limit of 2800 r.p.m.; some of these events have already been discussed in the connection with the deenergization of the synchronizing relay, the momentary energization of the calibrate relays, and the energization of the calibrate lock relays. The further effects of positioning the master r.p.m. control lever 12 in the 2800 r.p.m. position will be discussed hereinafter under the heading calibration.

The control windings of the three speeder rack servos may under certain conditions be short-circuited to freeze the respective servo motors and therefore the gang-operated respective sliders of associated potentiometers in place. However under usual synchronized operating conditions the servo motors are free to move and to assume positions corresponding to the selected synchronization speed as determined by the setting of the master r.p.m. control lever 12, so that the respective indicators register the same selected speed as previously explained.

The possible short circuit paths for the control windings of the three speeder rack servos are analogous to a certain extent and will be considered together to such extent by express description of such path for the winding 3016 of the $SR_3$ servo only, the paths for the corresponding windings of the other speeder rack servos being recognized by the correspondence of reference numerals. The path from the lower end of winding 3016 extends over a line 3086, through a contact 3088 to a junction point 3090. Contact 3088 is operable in three positions in accordance with the operation of the toggle lever 3042 to which it is connected by means of the mechanical connections 3078. The circuit path from the lower end of winding 3016 to junction point 3090 is complete only with toggle lever 3042 in its center-off position, being opened when toggle lever 3042 is in the increase or decrease position. As previously pointed out the center-off position of toggle lever 3042 is the position under usual synchronized operating conditions.

The short circuit path extends from the upper end of winding 3016 over line 3092 to a junction point 3094. The short circuit path between junction points 3090 and 3094 may be completed through the NC contact $\underline{4}$ of usually energized master lever relay 3044. Because the master lever relay is usually energized, such short circuit path is usually incomplete. There is an additional short circuit path provided between junction points 3090 and 3094, but the corresponding additional short circuit paths in the No. 2 and No. 4 systems differ somewhat therefrom necessitating separate consideration.

The additional possible short circuit path for winding 3016 continues from junction point 3090 through the NC contact $\underline{2}$ of usually energized follow-up relay 2302 and through the NO contact $\underline{4}$ of usually deenergized master engine relay 17 to junction point 3094. It is usually incomplete because neither contact is usually closed. The additional possible short circuit path for winding 2016 continues from junction point 2090 through the NC contact $\underline{3}$ of usually energized follow-up relay 2302 and through the NC contact $\underline{5}$ of usually deenergized master engine relay 17 to junction point 2094. It is usually incomplete because the former contact is usually not closed. The additional short circuit path for winding 4016 continues from junction point 4090 through the NC contact $\underline{2}$ of usually energized follow-up relay 4302 to junction point 4094. It is usually incomplete because this contact is usually not closed. Completion of the additional short-circuit paths requires deenergization of the respective follow-up relay, and in the case of the No. 2 and No. 3 systems depends additionally on the choice of which of these two engines shall be the master and the slave engines.

The toggle servos ($\Delta N$) will be considered next with reference to Fig. 2. Following the previous practice, the $\Delta N_3$ servo circuitry will be described expressly whereas the $\Delta N_2$ and $\Delta N_4$ servos should be considered simultaneously with the description of the $\Delta N_3$ servo bearing in mind the correspondence of reference numerals, so long as the three servos are analogous. The $\Delta N_3$ servo is provided with a servo amplifier 3096, a control winding 3098 for the associated servo motor represented together with an associated gear reducer by the letter M enclosed in a rectangle for simplicity, and an answer potentiometer card 3100 and other potentiometers shown in the other drawings, some of which other potentiometers have already been discussed. Card 3100 is energized at opposite ends by the reference voltages $-E$ and $+E$ and has a grounded center tap. Its slider 3102 is connected to the servo motor by means of the mechanical connections 3104. As will be seen hereinafter the slider 3102 usually connects to the grounded center tap of card 3100 corresponding to the usual undeflected zero position of the servo. A line 3106 is connected to the slider 3102 at one end and its other end is connected to three branch lines 3106a, 3106b and 3106c. For convenience in terminology the path through card 3100 over line 3106 and slider 3102 will be collectively referred to as the answer return.

The servo amplifier 3096 is provided with two internal inputs $-CAL$ and $-ANS$, at most one of which may be connected to the answer return at any one time whereas the other is then grounded. Upon other occasions both internal inputs are grounded. The external inputs to the servo amplifiers are the inputs $+RPM_{ma}$, $-SR_3$ and $\pm TOGGLE$. Under usual synchronized operating conditions the $-CAL$ and $\pm TOGGLE$ inputs to the servo amplifier of each toggle servo ($\Delta N$) are grounded, and therefore a single description for all three servos will suffice. The —CAL input is grounded through the NC contact 1 of usually deenergized calibrate relay 3058. During the aforedescribed momentary period of energization of the calibrate relay the —CAL input is connected through the NO contact 1 of the relay and over branch line 3106a to the answer return. The ±TOGGLE input is usually grounded through a contact 3108 which is operated in three positions according to the position of the toggle lever 3042, to which it is interconnected by means of the connections 3078, provided the toggle lever 3042 is in its center off-position. When the toggle lever 3042 is placed in its increase position, the ±TOGGLE input connects through contact 3108 to the reference voltage —E, whereas when the toggle lever is placed in its decrease position the input connects through contact 3108 to the reference voltage +E.

The inputs —ANS, and +RPM$_{ma}$ and —SR$_3$ are not completely analogous as regards the circuit paths for their respective input signals in the three servo systems. Moreover under usual synchronized operating conditions the respective inputs thereto are not the same for the three servos, all three inputs being usually grounded for the master engine whereas the slave engines receive effective signals at their respective inputs +RPM$_{ma}$ and —SR and also at their respective input —ANS. However the input —ANS for each slave engine toggle servo is also grounded by reason of the grounding of the answer return through the center tap of the associated answer card in the usual undeflected zero position of the respective servo. The input circuit paths for the —ANS, +RPM$_{ma}$ and —SR inputs will be considered together and also by a single description for the three servos to the extent applicable. Referring to the ΔN$_3$ servo expressly, its three input signals —ANS, +RPM$_{ma}$ and —SR$_3$ feed through the NO contacts 1, 2 and 3 respectively of the usually energized automatic relay 23. In the event that the automatic relay releases, by reason of placement of the synchronization switch 14 in its center off-position for example (Fig. 4), each of the three signals is grounded through the respective NC contacts of the automatic relay. Assuming that the automatic relay 23 is energized as it usually is, the three signals are fed to its three NO contacts from the three NO contacts 5, 6 and 7 of usually energized master lever relay 3044 respectively. Assuming that the master lever relay is deenergized whereas the automatic relay is energized, which conditions concur with the synchronization switch 14 in either the No. 2 or No. 3 position and the toggle lever 3042 being positioned in its increase or decrease position, the path for the —ANS signal extends instead through the NC contact 5 of master lever relay 3044 and branch line 3106c to the answer return; the path for the +RPM$_{ma}$ input signal extends instead through the NC contact 6 of master lever relay 3044 to the voltage +V$_{RPMma}$; and the path of the —SR$_3$ input extends instead through the NC contact 7 of master lever relay 3044 over line 3110 to the slider 3112 of a potentiometer card 3114 which is grounded at one end and supplied by the reference voltage —E at its other end. Another line 3111 also connects to slider 3112.

As shown the slider 3112 is operated according to the position of the SR$_3$ servo. For convenience in terminology the return through card 3114 and slider 3112 will be referred to as the speeder rack return. Connection of the —ANS, +RPM$_{ma}$ and —SR$_3$ inputs respectively to the answer return, the voltage +V$_{RPMma}$ and to the speeder rack return requires energization of the automatic relay 23 and deenergization of the master lever relay 3044 as stated, and such deenergization of the master lever relay requires positioning of the toggle lever 3042 in either its increase or decrease position. The shift of the toggle lever from its center off-position necessarily results in application of the reference voltage —E or +E to the ±TOGGLE input also as previously stated and also necessarily results in opening the short circuit for winding 3098 due to the shift from the center position of another contact 3116 also operated by the toggle lever 3042 and connected thereto by means of the connections 3078. As a result the ΔN$_3$ servo will be free to move to a position as determined by the now effective external signals to the inputs +RPM$_{ma}$, —SR$_3$ and ±TOGGLE and the slider 3102 will be positioned accordingly. As a result the input —ANS will receive from the answer return a non-zero signal in accordance with the position of the slider 3102.

Reverting to the usual condition of energization of both the automatic relay 23 and the master lever relays, the further paths from the contacts of the automatic relay 23 for the signals to the three inputs —ANS, +RPM$_{ma}$ and —SR differ for the three servos and will be discussed individually. The further paths for the ΔN$_3$ servo extend through the NO contacts 5, 6 and 7 of the master lever relay 3044 respectively and then to ground over the NC contacts 6, 7 and 8 of usually deenergized master engine relay 17 respectively. On the other hand the corresponding paths for the ΔN$_2$ servo, which is associated with the No. 2 engine which in turn is assumed to operate as a slave engine in view of the very deenergization of the master engine relay 17, and of the ΔN$_4$ servo, which is associated with the No. 4 slave engine, extend to their respective answer returns, the voltage +V$_{RPMma}$, and speeder rack returns. In the event the No. 2 engine is selected as the master engine by positioning the synchronization switch 14 to the No. 2 position (Fig. 4) with the attendant energization of the master engine relay 17, the relations of the —ANS, +RPM$_{ma}$ and —SR inputs of the ΔN$_3$ and ΔN$_2$ servos are inverted. The Δ inputs of the ΔN$_3$ servo will be returned respectively to the answer return, the voltage +V$_{RPMma}$ and the speeder rack return, whereas the corresponding inputs of the ΔN$_2$ servo will all be grounded, and whereas the corresponding inputs of the ΔN$_4$ servo will remain connected to its answer return, the voltage +RPM$_{ma}$ and its speeder rack return respectively. The aforegoing presupposes that the synchronizing relay 30 is also energized as it usually is, for the non-grounded paths for the —ANS, +RPM$_{ma}$ and —SR inputs of each servo feed through NO contacts of the synchronizing relay 30 as well. As a general proposition the synchronizing relay 30 will of course be energized when the automatic relay 23 and the master lever relays are also energized. The conditions whereunder the master lever relays and the automatic relay 23 are energized whereas the synchronizing relay 30 is deenergized arise due to opening of the energization circuit for the synchronizing relay 30 by virtue of calibration or of external engine seizure of the RPM No. 3 engine or RPM No. 2 engine (see Fig. 14).

Assuming that the automatic relay 23, the master lever relays and the synchronizing relay 30 are, as is usual, all energized, the complete path to the answer return for the input signal to the —ANS input of the ΔN$_4$ servo is over the NC contact 7 of the automatic relay 23, the NO contact 5 of the master lever relay 4044, the NO contact 9 of the synchronizing relay 30 and branch line 4106b; the complete path for its +V$_{RPMma}$ signal to the +RPM$_{ma}$ input is over the NO contact 8 of the automatic relay 23, the NO contact 6 of the master lever relay 4044 and the NO contact 10 of the synchronizing relay 30; and the complete path to its speeder rack return for its —SR$_4$ input is over the NO contact 9 of the automatic relay 23, the NO contact 7 of the master lever relay 4044, the NO contact 11 of the synchronizing relay 30 and line 4111. As assumed the No 2 engine is operating as a slave engine so that the master engine relay 17 is deenergized, in which case the —ANS, +RPM$_{ma}$ and —SR$_2$ inputs are connected to the associated answer return, the voltage $+V_{RPM_{ma}}$ and the associated speeder rack return respectively as follows: over the NO contact 4 of the automatic relay 23, the No contact 5 of the master lever relay 2044, the NC contact 9 of master engine relay 17, the NO contact 6 of the synchronizing relay 30 and branch line 2106b; over the NO contact 5 of automatic relay 23, the NO contact 6 of the master lever relay 2044, the NC contact 10 of master engine relay 17 and the NO contact 7 of the synchronizing relay 30; and over the NO contact 6 of automatic relay 23, the NO contact 7 of master lever relay 2044, the NC contact 11 of master engine relay 17, the NO contact 8 of synchronizing relay 30 and line 2111. The corresponding inputs of the master engine toggle servo $\Delta N_3$ are grounded through the NC contacts 6, 7 and 8 of the master engine relay 17 respectively.

If the No. 2 engine is selected as the master engine resulting in energization of the master engine relay 17, the three inputs to the $\Delta N_2$ servo in question are grounded through the NO contacts 9, 10 and 11 of the master engine relay 17 respectively, and the corresponding inputs of the $\Delta N_3$ servo are lifted off ground and are returned to its answer return, the voltage $+V_{RPM_{ma}}$ and its speeder rack return over the following complete paths respectively: over the NO contact 1 of automatic relay 23, the NO contact 5 of master lever relay 3044, the NO contact 6 of master engine relay 17, the NO contact 3 of synchronizing relay 30 and branch line 3106b; the NO contact 2 of automatic relay 23, the NO contact 6 of master lever relay 3044, the NO contact 7 of master engine relay 17 and the NO contact 4 of synchronizing relay 30; and the NO contact 3 of automatic relay 23, the NO contact 7 of master lever relay 3044, the NO contact 8 of master engine relay 17, the NO contact 5 of synchronizing relay 30 and line 3111. Under the special aforedescribed circumstance where the automatic relay 23 and the three master lever relays are energized whereas the synchronizing relay 30 is deenergized, the three inputs —ANS, $+RPM_{ma}$ and —SR of each slave engine toggle servo are grounded through their respective NC contacts of the synchronizing relay 30.

The short circuit paths for the control windings of the toggle servos ($\Delta N$) will now be described by way of a single description applying to the $\Delta N_3$ servo to the extent applicable. Beginning at the lower end of winding 3098 the short circuit path extends over line 3118, through toggle lever contact 3116 provided the toggle lever 3042 is its center off-position, and the NC contact 2 of calibrate relay 3058 provided the calibrate relay is, as usually, deenergized. In the event of shifting of the toggle lever 3042 from its center off-position to either its increase or the decrease position or during the aforedescribed momentary energization period of calibrate relay 3058 the short circuit path is necessarily opened. The short circuit path extends from the upper end of control winding 3098 over line 3120 to the NC contact 3 of usually deenergized resynchronizing relay 2304. In the event of energization of the resynchronizing relay attendant to the depressing of the resynchronizing button 34 the short circuit path is necessarily open. Completion of the short circuit path is different in each servo system necessitating individual consideration.

In the case of the $\Delta N_4$ servo the short circuit path is complete as described as the NC contact 3 of resynchronizing relay 4304 is tied to the NC contact 2 of the calibrate relay 4058. The short circuit path for winding 2098 is complete from the NC contact 2 of its calibrate relay 2058 to the corresponding NC contact 4 of the resynchronizing relay 2304 over the interconnecting NC contact 13 of usually deenergized master engine relay 17. If the No. 2 engine is selected as master engine the short circuit path is alternatively completed through the NO contact 13 of master engine relay 17, energized in such event, and over a branch line 2121 terminating in line 2120. With the No. 3 engine selected as master engine the short circuit path for winding 3098 is completed from the NC contact 2 of calibrate relay 3058 over the NC contact 12 of the master engine relay 17 to a corresponding branch line 3121 terminating in line 3120. If the No. 2 engine is selected as the master engine the short circuit path for winding 3098 is complete from the NC contact 2 of calibrate relay 3058 through the NO contact 12 of the master engine relay 17 and the NC contact 3 of the resynchronizing relay 2304. Completion of the short circuit paths for the control windings of the toggle servos requires that the respective toggle levers be in their center off-position; that the respective calibrate relays be deenergized with no further requirement in the case of the master engine servo. In the case of a slave engine system, it is additionally required that its resynchronizing relay be deenergized. In view of the usual conditions of the relays involved the three windings therefore are usually short-circuited, and as will be seen hereinafter, their servomotors are in the undeflected zero positions.

The circuitry of the band limit servos ($\Delta S$) will be considered next referring to Fig. 3. As previously stated a band limit servo is associated only with a slave engine, whereas the master engine has no band limit servo as its band for synchronization is not to be limited. Referring to Fig. 3, the $\Delta S_{2\ or\ 3}$ servo, which is associated with the engine No. 2 or engine No. 3 system depending on which of these engines is the slave engine, to the extent applicable, will be described expressly whereas the $\Delta S_4$ servo is to be considered concurrently having due regard to the correspondence of reference numerals. The $\Delta S_{2\ or\ 3}$ servo is similar to the speeder rack and toggle servos previously described, in that it is provided with an input amplifier 2330, a control winding 2332, a servo motor represented with the associated gear reducer by the letter M enclosed in a rectangle, and an answer potentiometer card 2334 and other potentiometer cards previously described. Potentiometer 2334 is energized at opposite ends by the voltages $+E$ and $-E$ and is insulated at its center as indicated by the dotted line 2336 thereby defining an upper and a lower half-potentiometer each of which is grounded at its respective center tap. The upper half potentiometer is additionally energized by the voltage $-E$ near the insulation line 2336 and the lower half potentiometer is energized by the voltage $+E$ also at the insulation line 2336. The upper and lower half potentiometers are each provided with a slider designated as 2338 and 2340 respectively, which may be positioned according to the position of the servo motor by means of the mechanical connections designated as 2342 and 2344 respectively. The sliders 2338 and 2340 move up and down in unison and therefore pick off voltages of the same magnitude and like sign at any given instant. As previously stated and as will be shown later the usual position for the servo motor is the undeflected zero position wherein the slider 2338 is connected to the upper grounded center-tap and the slider 2340 to the lower grounded center tap.

The servo amplifier 2330 is provided with two external inputs $+RPM_{ma}$ and $-\Delta N_{2\ or\ 3}$, an internal —ANS input and another input —M$a$ENG which in some instances may be connected to an external input and in other instances to an internal input, the latter being from the NC contact 6 of usually energized follow-up relay 2302 provided the relay is deenergized, over line 2346 to the slider 2338 of the upper half of potentiometer card 2334. For convenience in terminology the return over line 2346 and slider 2338 through potentiometer card 2334 will be referred to as the supplemental band limit servo answer return as distinguished from the main band limit servo answer return which permanently connects to the —ANS input and as such includes line 2348 and the slider 2340 of the lower half of potentiometer 2334, to which slider 2340 line 2348 is connected.

The inputs +RPM$_{ma}$, —ΔN$_{2\ or\ 3}$ and —M$a$ENG can be considered concurrently and to a certain extent as applicable to the ΔS$_4$ servo having regard to correspondence of the reference numerals. Their circuit paths extend respectively over the NO contact 4 of usually energized follow-up relay 2302 and the NO contact 12 of usually energized synchronizing relay 30 to the voltage +V$_{RPMma}$; over the NO contact 5 of usually energized follow-up relay 2302 to the NO contact 13 of usually energized synchronizing relay 30; and over the NO contact 6 of usually energized follow-up relay 2302 to the NO contact 14 of usually energized synchronizing relay 30. In the event that the follow-up relay 2302 is deenergized due to energization of the resynchronizing relay attendant to depressing of the resynchronizing button 34 (Fig. 5), these three inputs will be respectively grounded, and connected to the supplemental band limit servo answer return through the respective NC contacts of the follow-up relay 2302. In such case the —M$a$ENG and —ANS inputs will receive over their respective answer returns signals of the same magnitude and like sign to cause an extremely rapid run-down to the undeflected zero position. The run-down is rapid because of application of two rather than one answer signals.

Assuming that the follow-up relay is energized whereas the synchronizing relay 30 is deenergized as may have been for example in the event that the master RPM control 12 is placed in the 2800 r.p.m. calibrate position (see Fig. 4), the +RPM$_{ma}$, —ΔN$_{2\ or\ 3}$ and —M$a$ENG inputs are each grounded through respective NC contacts of the synchronizing relay 30 in which case the servo motor not controlled by any external effective inputs, "answers" itself to the undeflected zero position but not as rapidly as under the aforementioned conditions.

In the event that the follow-up relays and the synchronizing relay 30 are energized as usual, the further paths for the —M$a$ENG input extends over the NC contact 15 of usually deenergized master engine relay 17 to a slider 3130 of a potentiometer card 3132 whose one end is grounded and whose other end is energized by the voltage —E. The path for the corresponding input to the ΔS$_4$ servo is analogous and also extends to the same slider 3130 of the same potentiometer 3132 over the NC contact 16 of the master engine relay. The slider 3130 is positioned according to the position of the servo motor of the RPM No. 3 servo which in turn is of course determined according to the position of the SR$_3$ servo. The position of the SR$_3$ servo in turn is usually determined in accordance with the voltage +V$_{RPMma}$. The input +RPM$_{ma}$ to the servo amplifier 2330, as previously stated, is supplied usually directly by the voltage +V$_{RPMma}$. The summing resistor 2350 of the +RPM$_{ma}$ input is properly proportioned with reference to the summing resistor 2352 of the —M$a$ENG input that the voltages supplied therethrough to the servo amplifier 2330 are equal. Inasmuch as these voltages are inherently opposite and inasmuch as the input —ΔN$_{2\ or\ 3}$ receives usually no effective signal the net external input to the ΔS$_{2\ or\ 3}$ servo is usually zero.

If the No. 2 engine is selected as the master engine with the attendant energization of the master engine relay 17, the input circuit to the —M$a$ENG input extends over the NO contact 15 of relay 17 (instead of the NC contact 15) to a corresponding slider 2130 of a corresponding potentiometer 2132 whose one end is also grounded and whose other end is also supplied by the voltage —E. The corresponding input of the ΔS$_4$ servo continues over the NO contact 16 of master engine relay 17 to the same slider 2130 of the same potentiometer card 2132 which is operated in accordance with the position of the RPM No. 2 servo analogous to the operation of the slider 3130 by the RPM No. 3 servo. In such case the two inputs +RPM$_{ma}$ and —M$a$ENG will usually remain balanced nevertheless, as the SR$_2$ servo when operating as a master engine servo operates much in the manner as the SR$_3$ servo when it (the SR$_3$) operates as a master engine servo.

The further path for the —ΔN inputs from the NO contacts 13 and 16 of the usually energized synchronizing relay 30 differ for the ΔS$_{2\ or\ 3}$ and the ΔS$_4$ servo necessitating individual consideration. The —ΔN$_4$ input extends directly to a slider 4134 of a potentiometer 4136 which is energized at opposite ends by the voltages —E and +E. The slider is operated in accordance with the position of the ΔN$_4$ servo motor and is therefore, in the usual undeflected zero position of the ΔN$_4$ servo, connected to the grounded center tap, so that the input —ΔN$_4$ is in fact usually zero. The further path for the —ΔN$_{2\ or\ 3}$ input signal depends on the selection of the slave engine as between the No. 2 and No. 3 engine systems, being connected to a corresponding potentiometer of whichever toggle servo is the slave engine servo. In other words the —ΔN inputs of the band limit servos are determined in accordance with the position of the respective slave toggle servos in contradistinction to the —M$a$ENG input which is determined in accordance with the position of the same master r.p.m. servo and therefore the same master speeder rack servo. If the No. 3 engine is the master engine and therefore the No. 2 engine the slave engine, the further path for the —ΔN$_{2\ or\ 3}$ input extends from the NO contact 13 of synchronizing relay 30 over the NC contact 14 of master engine relay 17 to a corresponding slider 2134 of a corresponding potentiometer card 2136, also energized at opposite ends by the voltages —E and +E and also having a grounded center path. The slider 2134 is positioned according to the operation of the slave band limit servo ΔN$_2$ which is usually in its undeflected zero position wherein the slider 2134 is grounded at the center tap of potentiometer 2136, resulting in zero input signal to the input —ΔN$_{2\ or\ 3}$. If the No. 2 engine is selected as the master engine and therefore the No. 3 engine as a slave engine, the further path for the input —ΔN$_{2\ or\ 3}$ extends from the NO contact 13 of the synchronizing relay 30 through the NO contact 14 of now energized master relay 17 to a corresponding slider 3134 of a corresponding potentiometer 3136, also energized at opposite ends by the voltages —E and +E and also having a grounded center tap. The slider 3134 is positioned according to the operation of the now slave engine toggle servo ΔN$_3$ which is usually in its undeflected zero position, so that the slider 3134 is also usually connected to the grounded center tap of potentiometer 3136, which also results in a zero input to input —ΔN$_{2\ or\ 3}$.

The short circuit path for the control windings of the band limit servos will be discussed next and, insofar as applicable, by a single description with reference to the control winding 2332 of the ΔS$_{2\ or\ 3}$ servo. Beginning at the lower end of winding 2332 the short circuit path extends over a line 2354 to the contact 18 of usually energized synchronizing relay 30 at which contact the path is usually open, requiring deenergization of the synchronizing relay 30 for completion, as for example when the master r.p.m. control 12 is positioned in the 2800 r.p.m. calibrate position (see Fig. 4). Completion of the short circuit path for the two band limit servos under consideration is non-analogous necessitating separate consideration. Considering the ΔS$_4$ servo first, beginning at the upper end of its winding 4332, the short circuit path extends over line 4356 over the NC contact 3 of calibrate relay 4058 and then directly to the NC contact 19 of the synchronizing relay where it may be completed upon deenergization of the synchronizing relay 30. The circumstances under which the calibrate relay 4058 is deenergized while the synchronizing relay 30 is also deenergized will be discussed under the heading "Calibration" hereinafter. The short circuit path for the control winding 2332 of the $\Delta S_{2\ or\ 3}$ servo, beginning at the upper end of the control winding extends over a corresponding line 2356 to the corresponding NC contacts $\underline{3}$ of each of the calibrate relays 3058 and 2058 of the engine No. 3 and No. 2 systems respectively. Completion of the path to the NC contact $\underline{18}$ of the synchronizing relay 30 depends on which of the two engines is selected as the slave engine. In the event that the No. 2 engine is the slave engine, the path is completed through the NC contact $\underline{17}$ of deenergized master engine relay 17, whereas in the event the No. 3 engine is selected as the slave engine, the path is completed through the NO contact $\underline{17}$ of the master engine relay 17, now assumed to be energized. The circumstances under which the synchronizing relay 30 may be deenergized and the calibrate relays 3058 and 2058 also deenergized will likewise be discussed under the heading "Calibration."

With the description of the circuitry of the various servos completed, it is well-worth at this point to review the usual states of energization of deenergization of the internal control relays and the usual synchronized operating conditions of the various servos as they form the starting point for other modes of operation. Unless otherwise specified hereinafter these relays and servos will be assumed to be in the usual synchronized operating condition. The following relays are usually energized: the automatic relay 23, the three master lever relays 3044, 2044, and 4044, and the synchronizing relay 30. The master engine relay 17 is arbitrarily assumed to be "usually" deenergized in view of selection of the No. 3 engine as the master engine by positioning the synchronizing switch 14 in the No. 3 position.

The following relays are usually deenergized: the three calibrate relays 3058, 2058 and 4058, and the three calibrate lock relays 3060, 2060 and 4060. Additionally the two follow-up relays 2302 and 4302 are usually energized whereas the two resynchronizing relays 2304 and 4304 are usually deenergized. The three toggle levers 3042, 2042 and 4042 are usually assumed to be in their center off-positions.

The three speeder rack servos (SR) are usually free to move between the limits of 1200 r.p.m. and just short of 2800 r.p.m. and move to like extents responsive to positioning of the master r.p.m. control 12. The only effective input signal to each is the voltage $+V_{RPM_{ma}}$, applied to the $+RPM_{ma}$ input of each and having a magnitude in accordance with the position of the master r.p.m. control lever 12. The three toggle servos ($\Delta N$) usually have their windings short-circuited so that their motors are frozen. The effective inputs of the master engine toggle servo are all grounded, whereas the input $+RPM_{ma}$ of each of the slave engine toggle servos is returned to the voltage $+V_{RPM_{ma}}$ whose value is in accordance with the position of the master r.p.m. control 12. The speeder rack inputs ($-SR$) of the slave toggle servos are determined in accordance with the position of their respective speeder rack servos, whereas their $\pm TOGGLE$ inputs are usually grounded. Although the slave toggle servos are subject to effective external input signals, namely $+RPM_{ma}$ and $-SR$ they are nevertheless usually in the undeflected zero position as their servo motors are frozen in place due to the short-circuiting of their control windings. The two band limit servos are usually free to move but nevertheless are usually in the undeflected zero position as their two respective only external effective inputs $+RPM_{ma}$ and $-M\alpha ENG$ are effectively balanced, the remaining effective input $-\Delta N$ from their respective slave toggle servos being usually zero corresponding to their usual undeflected zero positions.

The toggle servos and the band limit servos are generally placed in their usual undeflected zero positions as the result of initial calibration on take-off of the simulated flight, when as in the actual plane the master r.p.m. control 12 is placed in the 2800 r.p.m. calibrate position. The calibrate operation will be discussed next.

CALIBRATION

For calibration purposes the student pilot positions the master r.p.m. control 12 in the 2800 r.p.m calibrate position (Fig. 1). The following description attendant to such positioning is uniformly applicable, with a few stated exceptions, to the servos of each engine system and to such extent specific reference will be made only to the servos of the No. 3 master engine. The servo motor 3006, under the influence of the maximum $+V_{RPM_{ma}}$ voltage, runs towards the upper 2800 r.p.m. limiting position causing the slider 3024 to reach the upper portion 3036 of potentiometer card 3010, and the consequent lighting of lamp 3040. Referring to Fig. 4, with lever 12 in the 2800 r.p.m. position the cam 28 is caused to position the contact 26 so as to open connection of relay 30 to the usual ground return and close the calibrate ground return. The synchronizing relay 30 is deenergized and the three calibrate relays 3058, 2058 and 4058 are energized as their energization circuits are completed through the NC contacts $\underline{1}$ of their respective calibrate lock relays 3060, 2060 and 4060. However as will be immediately apparent, the energization of the calibrate relays is only momentary and these relays will be deenergized again upon energization of the calibrate lock relays. Referring again to Fig. 1 and considering the description of the $SR_3$ servo as applying to the other speeder rack servo as well, the short circuit path and input circuit paths remain unchanged, but the $-\Delta N$ input, unless it had been zero before, will become zero as the slider 3080 will assume the position connecting to the grounded center tap of potentiometer 3082. This is so in view of the fact that the $\Delta N_3$ servo will run to undeflected zero.

The $+\Delta S$ input of the master engine SR servo had been and remains grounded through a contact of the master engine relay. The $\Delta S$ input of the slave engine SR servos had been and remain connected to respective sliders 2320 and 4320 of the band limit servo potentiometers 2322 and 4322 respectively. These sliders, unless they had been connected to the grounded center-taps of their respective potentiometers before, will now be so connected. This is so because the band limit servos are also running to undeflected zero.

Referring to Fig. 2 and again considering the description of the $\Delta N_3$ servo representative, insofar as applicable to the other two toggle servos, the short-circuit path for the control winding 3098 is now opened in view of the energization of the calibrate relay 3058. The $\Delta N_3$ servo therefore becomes free to move and it does in fact move to its undeflected zero position in view of the fact that the $\pm TOGGLE$ input remains grounded through toggle contact 3108 in its center off-position as before, whereas the $-CAL$ input is returned through the NO contact $\underline{1}$ of now energized calibrate relay 3058 to the answer return. The $-ANS$, $+RPM_{ma}$ and $-SR$ inputs of the master engine toggle servo had been and remain grounded through contacts of the master engine relay 17. The corresponding inputs of the slave engine toggle servos are now grounded through respective NC contacts of the deenergized synchronizing relay 30. The $\Delta N$ servos being subject only to an answer type internal input signal and being free to move, are caused to run to their deflected zero position wherein the sliders of their answer cards are positioned at the grounded center taps, so that the $-CAL$ inputs are also ultimately grounded.

Referring to Fig. 3 for a study of the effects of calibration on the band limit servos, the description for the $\Delta S_{2\ or\ 3}$ servo is also applicable to the $\Delta S_4$ servo. The inputs $+RPM_{ma}$, $-\Delta N_{2\ or\ 3}$ and $-MaENG$ of the $\Delta S_{2\ or\ 3}$ servo are grounded, owing to the deenergization of the synchronizing relay 30, respectively through its NC contacts 12, 13 and 14. Its NC contact 18 in the short-circuiting path for winding 2352 also closes but at the same time the NO contact 3 of the now energized calibrate relay 2058 opens, so that the servo motor of the $\Delta S_{2\ or\ 3}$ servo remains free to move. If the No. 2 engine had been selected as the master engine resulting in closure of the NO contact 17 of the master engine relay the short-circuit path for winding 2332 would nevertheless remain open due to the opening of the NC contact 3 of the now energized calibrate relay 3058. In view of the fact that the only non-zero input to the $\Delta S_{2\ or\ 3}$ servo is the $-ANS$ input the servo motor will run to the undeflected zero position. When this position is attained the $-ANS$ input will become zero as well.

The aforegoing description of operation of the $\Delta S_{2\ or\ 3}$ servo specifically and of the $\Delta S_4$ servo by implication presupposed that the follow-up relays were, as usual, energized even during the calibration. Should a follow-up relay, say relay 2302, be deenergized, as for example upon initial application of power by reason of the fact that the position of the slider 2314 of the $\Delta S_{2\ or\ 3}$ servo card 2308 is then random, and therefore possibly not at the undeflected zero position (Fig. 5), the servo will nevertheless run to the undeflected zero position during calibration. Referring again to Fig. 3 and again implicitly considering also the $\Delta S_4$ servo, in such case the inputs $+RPM_{ma}$ and $-\Delta N_{2\ or\ 3}$ will again be grounded as in the previous example but now through the NC contacts 4 and 5 respectively of the follow-up relay 2302. The $-MaENG$ input will be returned to the supplemental band limit servo answer return through the NC contact 6 of the follow-up relay 2302, now assumed to be deenergized, so that the servo amplifier 2330 will be subject only to two answer signals applied to the inputs $-MaENG$ and $-ANS$. This will cause the aforediscussed rapid rundown of the servo motor to the undeflected zero position. Referring to Fig. 5 with the grounded slider 2314 connected to the center portion of card 2308 in the undeflected zero position of the servo, the energization path for the follow-up relay 2302 is now complete, so that the relay is energized and thereafter "holds" itself through its grounded NO contact 1. Referring again to Fig. 3, its NO contacts 4, 5 and 6 are closed returning the inputs $+RPM_{ma}$, $-\Delta N_{2\ or\ 3}$ and $-MaENG$ to ground respectively through the NC contacts 12, 13 and 14 of the deenergized synchronizing relay 30. The follow-up relay 2302 has contacts 2 and 3 respectively in the short-circuiting paths for the control windings of the SR$_3$ and SR$_2$ servo, but the state of energization or deenergization of the follow-up relay at this time is immaterial as the short-circuit paths for these windings are opened through the NO contacts 3 of their respective calibrate relays.

Referring to Fig. 4, as a consequence of the attainment of the undeflected zero position by the toggle servos and of the 2800 r.p.m. position by the speeder rack servos, the three calibrate lock relays will be energized and therefore the three calibrate lock relays will be deenergized again. The description of the energization of the calibrate lock relay 3060 is intended to be equally applicable to the description for the calibrate lock relays of the other two systems. The energization path of the calibrate lock relay 3060 extends from the $+E$ (D.C.) line 15 through the cam operated contact 3066 now connected thereto in view of the SR$_3$ servo having attained the 2800 r.p.m. position, line 3072, and contact 3070 now connected to line 3072 in view of the $\Delta N_3$ servo having attained its undeflected zero position, and through the relay coil to the calibrate ground return. Its NO contact 2 closes establishing a hold circuit from the $+E$ (D.C.) line 15 through the NO contact 2 and the relay coil to the calibrate ground return. On the other hand its NC contact 1 opens thereby opening the energizing circuit for the calibrate relay 3058 which now releases. Referring again to Fig. 2 with the release of the calibrate relay 3058, its NC contact 2 closes again thereby again completing the short circuit path for the control winding 3098. The servo motor is frozen in the undeflected zero position and at the same time the input $-CAL$ is now grounded through the NC contact 1 of calibrate relay 3058 again, instead of through the NO contact 1 and answer return. The circuit conditions of the toggle servos remain otherwise the same. Referring to Fig. 3 again, the short-circuit paths for the control windings of the band limit servos will now be complete for the first time owing to the deenergization of the calibrate relays, coupled with the presently prevailing deenergization of the synchronizing relay 30. These two states of deenergization are necessary and sufficient per se for the short-circuiting of the control winding 4332 of the $\Delta S_4$ servo, whereas in the case of the short-circuit path of control winding 2332 of the $\Delta S_{2\ or\ 3}$ servo these two conditions are also necessary and sufficient, as the master engine relay 17 must necessarily be either energized or deenergized. If it is deenergized the short-circuit path is completed from the NC contact 18 of the synchronizing relay 30 and the NC contact 3 of the calibrate relay 2058 over the NC contact 17 of relay 17, whereas if the master engine relay 17 is energized by selection of engine No. 2 instead of engine No. 3 as the master engine, the short-circuit path is completed from the NC contact 18 of the synchronizing relay 30 through the NO contact 17 of the master engine relay 17 to the NC contact 3 of calibrate relay 3058. The circuit conditions for the band limit servos remain otherwise the same and the circuit conditions for the speeder rack servos of course are not affected by the state of energization or de-energization of the calibrate relays in any event and therefore remain the same.

With the deenergization of the calibrate relays calibration is complete and the apparatus remains in the state as at the end of calibration until the student pilot again operates the master r.p.m. control lever 12 to a position corresponding to less than 2800 r.p.m., as a consequence of which the usual synchronized operating conditions will again prevail. Inasmuch as the circuit conditions corresponding to the usual synchronized operating conditions have already been summarized, they will not be repeated here except to recall that the short circuit paths for the control windings of the band limit servos are opened again, enabling the respective servo motors to move once more from the undeflected zero position. However, during the usual synchronized operating conditions the band limit servos will stay at their respective undeflected zero positions, irrespective of the position of the master r.p.m. control lever 12, because their only effective external inputs $+RPM_{ma}$ and $-MaENG$ will remain equal and opposite. With the circuit conditions prevailing under usual synchronized operating conditions known, the changes in such condition owing to "toggling," i.e. manual speed control of a particular engine, may be considered. However this subject matter will be treated under two separate headings "Sync. Off-Toggling" and "Sync. On-Toggling" corresponding to the toggling operation with the synchronization switch 14 in its center off-position and in either of its No. 2 or No. 3 on-positions, respectively.

SYNC. OFF-TOGGLING

The starting point for sync. off-toggling are the usual synchronized operating condition wherein the speeder rack servo motors are positioned corresponding to an engine speed of less than 2800 r.p.m. The student pilot positions the synchronizing switch 14 in its center off-position with the result that the usual ground return, the master engine ground return and the calibrate ground return are all opened with switch contact 27 in its center off-position, thereby deenergizing all relays whose energization paths are shown in Fig. 4 unless such relays had been deenergized under usual synchronized operating conditions. The follow-up and resynchronizing relays in Fig. 5 of course retain their energized and deenergized conditions respectively being independent of the three aforementioned ground returns. The same result would obtain if the instructor had operated the synchronization fail switch 22 so as to disconnect it from line 21 in Fig. 4. Referring to Fig. 1 and considering the three SR servos simultaneously, the ±TOGGLE inputs remain grounded as before, whereas the −ANS, +ΔS, +RPM$_{ma}$ and −ΔN inputs are grounded respectively through the NC contacts 1, 2 and 3 of the respective master lever relays, now deenergized. The short-circuit paths for the control windings are completed through the NC contacts 4 of respective deenergized master lever relays. As a result the speeder rack servos are frozen in the positions attained just before throwing switch 14 to its off-position.

Referring to Fig. 2 and considering the three toggle servos simultaneously, the −CAL and ±TOGGLE inputs remain grounded as before, whereas the −ANS, +RPM$_{ma}$ and −SR inputs are now grounded through respective NC contacts of the new deenergized automatic relay. The short-circuit paths for the control windings remain complete, so that the toggle servos remain frozen in the undeflected zero position.

Referring to Fig. 3 and considering the two band limit servos simultaneously, the −ANS inputs of course remain permanently connected to respective main band limit servo answer returns. The +RPM$_{ma}$, −ΔN and −M$a$ENG inputs are grounded through respective NC contacts of the now deenergized synchronizing relay 30. The short circuit paths for the control windings are now completed through respective NC contacts of the now deenergized synchronizing relay 30, so that the band limit servos are now frozen in the undeflected zero position.

Toggling of the No. 3 engine subsequent to shifting of the synchronizing switch 14 to the off-position may be considered as typical for the other engine systems were they toggled, having regard to corresponding reference numerals in the systems of the other engines. Minor differences in the operation of the other two engine systems will be pointed out. Assuming that the servo motor 3006 had been frozen at a position corresponding to 2400 r.p.m. upon shifting of the synchronization switch 14, let it be assumed that the student pilot desires to decrease the Engine No. 3 speed to say 2300 r.p.m. To this end he positions the toggle lever 3042 in the decrease position thereby switching the toggle contact 3076 and the ±TOGGLE input of the SR$_3$ servo from ground to the voltage −E and also switching the toggle contact 3088 to open short circuit for the control winding 3016. Conversely if the pilot desired to increase the speed of the No. 3 engine to say 2500 r.p.m. he would position the toggle lever 3042 to the increase position resulting in application of the voltage +E to the ±TOGGLE input and also resulting in opening the short circuit for the control winding 3016. Inasmuch as the increase operation in analogous to the decrease operation except for reversal in sign of voltage and direction of rotation of the servo motor, the increase operation will be readily understood from the description of the decrease operation and will therefore not be specifically described.

Responsive to application of the input voltage −E to the ±TOGGLE input and, inasmuch as the other inputs of the SR$_3$ servo are grounded, responsive only to such input voltage the servo motor moves towards the 2300 r.p.m. position as indicated by the instrument 3032. The slider 3080 also moves towards a new position, corresponding to a deflection of the ΔN$_3$ servo of +100 r.p.m. from its undeflected zero position responsive to the toggling operation as will be seen immediately hereinafter, but this is of no consequence at the present as the −ΔN$_3$ input remains grounded. The other speeder rack servos SR$_2$ and SR$_4$ remain frozen in the 2400 r.p.m. position as their control windings are short-circuited and as their effective inputs including the ±TOGGLE inputs and the +ΔS inputs remain grounded, the former through the respective toggle contacts and the latter through the sliders 2320 and 4320 respectively which sliders are in the grounded undeflected zero position of their respective band limit servos. The band limit servos remain in the condition attained when switch 14 was thrown to the center off-position, i.e. frozen in the undeflected zero position. The conditions of the band limit servos and therefore the three +ΔS inputs are the same whichever engine is toggled. If the SR$_2$ servo had been toggled whereas the SR$_3$ and SR$_4$ servos had not been toggled, the SR$_2$ servo would be caused to approach the 2300 r.p.m. position whereas the other speeder rack servos would remain at their 2400 r.p.m. positions. Similarly if the SR$_4$ servo had been toggled, the SR$_4$ servo would be caused to approach the 2300 r.p.m. position whereas the other speeder rack servos would remain at their 2400 r.p.m. positions. In other words during sync. off-toggling each engine behaves as though it were a slave engine.

Reverting to the example of toggling the No. 3 engine, and referring to Fig. 2, with the switching of toggle lever 3042 from its center off-position, the voltage +E is applied to the ±TOGGLE input of the ΔN$_3$ servo through toggle contact 3108 and at the same time the short circuit for winding 3098 is opened with the toggle contact 3116 in the decrease position. Conversely had the toggle lever 3042 been shifted to the increase position the reference voltage −E would have been applied to the ±TOGGLE input through contact 3108 and the short-circuit path for winding 3098 would likewise have been opened. Application of the voltage −E merely results in equal but opposite servo motor motion and therefore need not be described in detail. Inasmuch as the other inputs of the ΔN$_3$ servo are grounded the input voltage +E is the only effective input voltage to the servo amplifier and as a result the servo motor moves to approach a position of +100 r.p.m. corresponding to the difference in engine speed between the initial 2400 r.p.m. and the desired 2300 r.p.m. The other toggle servos remain frozen in their undeflected zero positions. When the student pilot observes an indication by the instrument 3032 of 2300 r.p.m. he reverts the toggle switch 3042 to its center off-position grounding the ±TOGGLE inputs to the SR$_3$ and ΔN$_3$ servos once more through toggle contacts 3076 and 3108 and at the same time closing the short-circuit paths for the respective control windings through toggle contacts 3088 and 3116. All the inputs to these two servos are grounded once more and the servo motors are frozen in the positions corresponding to 2300 r.p.m. and +100 r.p.m. respectively. The sync. off-toggling operation so far would have been the same for one of the other two engines had such one engine rather than the No. 3 engine been toggled.

If the student pilot now repositions the synchronization switch in one of its on-positions, the further events are somewhat different for the case of initial sync. off-toggling of what is now the master engine from the case of sync. off-toggling of either of the two engines now slave engines. The further events for either of the slave engines are similar to one another. However, the treatment of the several engine systems can be generalized by the following three equations, in each of which the left hand term represents the position of a servo and the terms on the right hand side represent external inputs to such servo:

(1) $SR = +RPM_{ma} - \Delta N + \Delta S$ (2) $\Delta N = +RPM_{ma} - SR$ (3) $\Delta S = -(RPM_{ma} - MaENG - \Delta N)$ Several precautions are in order when substituting specific numerical values for the terms in these equations. For one, the servo motor must be free to move to the position indicated by the equation. Inasmuch as the $\Delta N$ servos are generally frozen in place while the other servos may be free to move, these equations should not be solved simultaneously. As a matter of fact it will be recalled, that the toggling servos of the non-toggled engines had been frozen at undeflected zero prior to switching of the synchronization switch 14 to the off-position, during toggling, upon completion of toggling, and upon repositioning of switch 14 to an on-position. This is so because the toggle lever and relay contacts that complete the short-circuit paths for their control windings, experienced no change in state, except possibly for the contacts of the master engine relay 17. Had the No. 2 engine been initially or finally the master engine, the short-circuit paths for windings 3096 and 2096 would have opened due to shift of respective contacts 12 and 13 of relay 17, but only momentarily so in view of the immediate closure of an alternative short-circuit path, insufficient to cause motor movement. Except for opening of the short-circuit path of a toggled $\Delta N$ servo during toggling resulting in its deflection of $+100$ r.p.m., the aforegoing frozen state of its servo motor is likewise true, so that Equation 2 will not apply at all at this point, nor even for the case of sync. on-toggling. It will become effective with operation of the resynchronizing button 34 as described under the heading "Resynchronization."

Another precaution relates to the value of the term $\Delta S$ in Equations 1 and 3. For reasons apparent hereinafter, the absolute value of the term $\Delta S$ in Equation 1 never exceeds 80 r.p.m., even though the absolute value of the same term $\Delta S$ in Equation 3 may exceed 80 r.p.m.

The series of events subsequent to repositioning switch 14 to an on-position will be covered by a detailed description of the servois' operation for one possible combination of toggled and non-toggled engines in each of the two cases of initial toggling of an engine which upon such repositioning became a master engine and of an engine which was or became a slave engine. For other possible combinations the operation is entirely analogous and may be readily determined by reference to the following tables and correspondence of reference numerals.

Table I.—*Master engine initially toggled*

| Master Engine | Slave Engine | Slave Engine |
|---|---|---|
| 3 | 2 | 4 |
| 2 | 3 | 4 |

Table II.—*Slave engine initially toggled*

| Master Engine | Toggled Slave Engine | Non-Toggled Slave Engine |
|---|---|---|
| 3 | 2 | 4 |
| 3 | 4 | 2 |
| 2 | 3 | 4 |
| 2 | 4 | 3 |

In each of Tables I and II combinations are presented in rows and the engines whose servos operate analogously are listed in columns. The first-listed combination in each table will be described in detail as to operation. Differences as to other combinations arise out of the energization of master engine relay 17 with selection of the No. 2 engine as master engine and the consequent inversion of relations of the No. 2 and No. 3 engines and also out of absence of contacts of this relay at corresponding circuit locations for the No. 4 engine. These can be recognized practically by inspection.

It should be noted that the identity of the master engine prior to switching the synchronization switch off is immaterial. What matters is the identity of the master engine upon repositioning switch 14 to an on-position. Therefore, for example, for the case where the No. 3 engine had been initially the master engine and had thereafter been sync. off-toggled and thereafter the No. 2 engine had been selected as master engine, the second combination in Table I applies. Considering the first combination in Table I, assuming that the No. 3 engine had been toggled to a 2300 r.p.m. position and that thereafter the synchronizing switch 14 was positioned to the No. 3 position, the input of each of the speeder rack servos, each of the toggle servos and each of the band limit servos will be reconnected as under usual synchronized operating conditions but the magnitude of some of these input signals will have changed from the initial values corresponding to the 2400 r.p.m. position of the $SR_3$ servo. The input voltage $+V_{RPM_{ma}}$ will be reapplied to the $+RPM_{ma}$ input through the NO contact 2 of the master lever relay 3044 at its initial value of 2400 r.p.m. as the master r.p.m. control lever 12 had not been shifted from its 2400 r.p.m. position. However the servo does not revert to its 2400 r.p.m. position as the difference of 100 r.p.m. is now balanced by the input signal to the $-\Delta N_3$ input through the NO contact 3 of the reenergized master lever relay 3044 from the slider 3080 which is now positioned at a position of $+100$ r.p.m. in accordance with the new $+100$ r.p.m. position of the $\Delta N_3$ servo attained during toggling and maintained thereafter as previously explained.

As will be seen hereinafter the $\Delta S_{2\ or\ 3}$ servo is caused to move to a $-100$ r.p.m. position, but this is of no consequence insofar as the speeder rack servo of the toggled master engine is concerned as its $\Delta S$ input is grounded through a contact of master engine relay 17. Upon repositioning of switch 14 to the No. 3 position the $+\Delta S_3$ input of the $SR_3$ servo remains grounded through the NC contact 2 of relay 17. The position of the $SR_3$ servo is determined by substitution in Equation 1, namely $$SR_3 = +2400 - 100 + 0 = 2300 \text{ r.p.m.}$$

The value of 2300 r.p.m. is the same as upon completion of toggling, so that the $SR_3$ servo does not move after repositioning of switch 14. As explained, the toggle servos (Fig. 2) remained frozen in their positions as at the end of toggling, but their inputs were reconnected as under usual synchronized operating conditions. More specifically, the toggled master engine servo remained frozen at $+100$ r.p.m. and the slave engine servos remained frozen at 0 r.p.m.

With the repositioning of the synchronizing switch 14 in its No. 3 on-position the short-circuit paths for the control windings of the band limit servos are opened once more due to the reenergization of synchronizing relay 30, rendering the respective servo motors free to move again. Considering both servos simultaneously by specific reference to the $\Delta S_{2\ or\ 3}$ servo only, the input $+RPM_{ma}$ is reconnected to the voltage $+V_{RPM_{ma}}$ through the NO contact 12 of the reenergized synchronizing relay 30. However, the voltage $+V_{RPM_{ma}}$ still corresponds to the value of 2400 r.p.m. whereas the input voltage $-MaENG$ now receives an input corresponding to only 2300 r.p.m., it being reconnected to the slider 3130 of the potentiometer card 3132, which slider is now positioned in a 2300 r.p.m. position in accordance with the new 2300 r.p.m. position of the RPM No. 3 servo. The RPM No. 3 servo was positioned at 2300 r.p.m. in accordance with the operation of the $SR_3$ servo. The $-\Delta N_{2\text{ or }3}$ input is reconnected through the NO contact $\underline{13}$ of the reenergized synchronizing relay 30 to the slider 2134 of the $\Delta N_2$ potentiometer 2136; however this slider remained in the undeflected zero position as previously explained. By substituting in Equation 3 there is obtained for the position of the $\Delta S_{2\text{ or }3}$ (and also the $\Delta S_4$) servo: $-(2400-2300-0) = -100$ r.p.m as previously stated.

Referring again to Fig. 1 and considering the description of operation of the $SR_2$ servo as also applying to the $SR_4$ servo by implication, its $\pm$TOGGLE and $-\Delta N_2$ inputs will remain at zero in view of the unchanged position of the toggle lever 2042 and in view of the fact that the $\Delta N_2$ servo has remained in its undeflected zero position. The $\Delta N_2$ input is reconnected to the slider 2030 through the NO contact $\underline{3}$ of the master lever relay 2044. The input $+RPM_{ma}$ is reconnected to the voltage $+V_{RPM_{ma}}$ through the NO contact $\underline{2}$ of master lever relay 2044 at its initial value corresponding to 2400 r.p.m. The $-$ANS signal is reconnected to its answer return through the NO contact $\underline{1}$ of the master lever relay 2044. The $+\Delta S_2$ input remains connected to the slider 2320 of the $\Delta S_{2\text{ or }3}$ card 2322. The $\Delta S_{2\text{ or }3}$ servo has assumed a position of $-100$ r.p.m. as stated but the card 2322 is so contoured as to permit a deviation of the slider 2320 from the undeflected zero position of only $\pm 80$ r.p.m. The slider 2320 will therefore have deviated only $-80$ r.p.m. and the $SR_2$ and $SR_4$ servos will assume a position computed according to the Equation 1 with the 80 r.p.m limitation inserted: $+2400-0-80=2320$ r.p.m. Thus the $SR_2$ and $SR_4$ slave engine servos will run to a final position corresponding to only 2320 r.p.m. and not to the 2300 r.p.m. to which the master engine speeder rack servo had been toggled. Had the master engine speeder rack servo been toggled from an initial 2400 r.p.m. to a final speed no less than 2320 r.p.m., the $SR_2$ servo (and for that matter the $SR_4$ servo) would have followed the $SR_3$ servo to synchronism. The slave engines may now be resynchronized individually by operating their respective toggle levers or concurrently by operating the resynchronizing button 34; these two modes of resynchronization will be discussed hereinafter under the headings "Sync. On-Toggling" and "Resynchronization."

Referring to Fig. 2, owing to the movement of the slave speeder rack servos the $-$SR inputs to the slave engine toggle servos are changed accordingly to a value corresponding to 2320 r.p.m. or whatever final position assumed by the slave speeder rack servos, but this is of no further consequence as the respective control windings remain short-circuited. Their remaining inputs are supplied as under the initial usual synchronized operating conditions with the master r.p.m. control 12 positioned to a selected speed of 2400 r.p.m., whereas all of the inputs of the toggled master engine toggle servo ($\Delta N_3$) are grounded as under the initial usual snychronized operating conditions.

Considering the case of initial sync. off-toggling of a slave engine, specifically the first combination in Table II, at the end of the toggling operation and before repositioning of the synchronization switch 14, the No. 3 and No. 4 servos were in the same condition as upon switching of the synchronization switch 14 to its off-position, these servos not having been toggled. The $\Delta S_{2\text{ or }3}$ servo in this example is associated with the No. 2 engine as the slave engine. Upon repositioning of the synchronization switch in the No. 3 position, the No. 3 and No. 4 servo systems revert to their usual synchronized operating conditions corresponding to the selected speed of 2400 r.p.m. By analogy to the previous example with reference to the toggling of the No. 3 engine, at the end of the toggling the $SR_2$ servo had assumed a position corresponding to 2300 r.p.m., its control winding was short-circuited and all its effective inputs were grounded. The $\Delta N_2$ servo had assumed a position corresponding to $+100$ r.p.m., its control winding 2098 was short-circuited and each of its external effective inputs $+RPM_{ma}$, $-SR_2$ and $\pm$TOGGLE were grounded. The $\Delta S_{2\text{ or }3}$ servo had its control winding 2332 short-circuited in the undeflected zero position, while each of its effective external inputs $+RPM_{ma}$, $-\Delta N_{2\text{ or }3}$ and M$a$ENG were grounded. With the repositioning of the synchronization switch 14 the winding 2098 of the $\Delta N_2$ servo remains short-circuited at the $+100$ r.p.m. position, whereas the short-circuits for the windings of the $SR_2$ servo and the $\Delta S_{2\text{ or }3}$ servo are opened again due to the reenergization of the master lever relay 2044 and of the synchronizing relay 30 respectively. These servos had then become free to move again. The $\Delta S_{2\text{ or }3}$ servo assumes a position computed according to Equation 3:

$$-(2400-2400-100) = +100 \text{ r.p.m.}$$

The $SR_2$ servo assumes a position according to its effective input signals $+S_2$, $+RPM_{ma}$ and $-\Delta N_2$, except that the $+\Delta S_2$ input has not assumed the value of $+100$ r.p.m., but a value of only $+80$ r.p.m. as limited by the contour of the $\Delta S_{2\text{ or }3}$ potentiometer card 2322. By substitution in Equation 1 $SR_2=2380$ r.p.m. and the $SR_2$ servo assumes such position. If it is desired to return the No. 2 engine to the synchronous speed of 2400 r.p.m. it would be necessary to toggle the No. 2 engine or to depress the resynchronizing button These operations will be explained under the headings "Sync. On-Toggling" and "Resynchronization." The $\Delta N_2$ servo is of course reconnected as under usual synchronized operating conditions. Its $-SR_2$ input however corresponds to only 2380 r.p.m. in accordance with the new position of the toggled slave engine ($SR_2$) servo. This is of no consequence at the present, as the control winding 2098 remains short-circuited.

SYNC. ON-TOGGLING

As in the case of sync. off-toggling the description except for reversal of signs of voltages and directions of servo motor rotation applies equally to toggling for increase and decrease of the engine speed. The description will be limited again to the case of decreasing the engine speed, say from 2400 r.p.m. to 2300 r.p.m. Again the cases of master engine and slave engine toggling must be differentiated; Tables I and II should be referred to again, as only the first-listed combinations therein will be described. The initial conditions prevailing in this example are the usual synchronized operating conditions.

Equations 1 and 3 are applicable again upon completion of toggling to all engines and are applicable even during toggling to the non-toggled engines. Equation 2 still has no application for the non-toggled systems during or after toggling; for the toggled engine during actual toggling it is best to consider the speeder rack and toggle servomotors as moving under the influence of the voltages $\mp$E and $\pm$E respectively and in a manner more nearly similar to a continuously operative motor rather than a servo positioning motor; the motors are brought to a stop by repositioning of the associated toggle lever to the center-off position. The upper and lower signs for the voltages $\mp$E and $\pm$E correspond to toggling to decrease and increase engine speed respectively. (Equation 2 becomes effective upon resynchronization as discussed hereinafter.

The sole influence of the toggle voltage $\mp$E holds exactly true in the case of the toggled speeder rack servo, as its inputs other than the $\pm$TOGGLE input are grounded through respective NC contacts of the associated master lever relay (Fig. 1), which is deenergized with operation of the associated toggle lever (Fig. 4). On the other hand, the associated toggle servo (ΔN) receives effective external signals to the +RPM$_{ma}$ and −SR inputs over respective NC contacts of the master lever relay and respective NO contacts of the synchronizing relay 30 in the form of the voltage +V$_{RPMma}$ and of the voltage derived from the associated speeder rack servo card respectively (Fig. 2).

However the ±TOGGLE summing resistor 3079 is so pro-positioned with reference to the +RPM$_{ma}$ summing resistor 3081 and the −SR$_3$ summing resistor 3083 of the ΔN$_3$ servo as to render the +RPM$_{ma}$ and −SR$_3$ inputs negligible in comparison with the ±E toggle voltage. The same considerations prevail for the ΔN$_2$ and ΔN$_4$ servos as recognized by correspondence of reference numerals.

Considering the case of sync. on-toggling of a master engine and more specifically the first-listed combination in Fig. 1, with the toggle lever 3042 positioned in the decrease position, the master lever relay 3044 is deenergized so that the −ANS, +RPM$_{ma}$ and −ΔN$_3$ inputs of the SR$_3$ servo (Fig. 1) are grounded respectively through the NC contacts $\underline{1}$, $\underline{2}$ and $\underline{3}$ of the master lever relay 3044. The +ΔS$_3$ input remains grounded through the NC contact $\underline{2}$ of the master engine relay 17. With the deenergization of the master lever relay 3044 its NC contact $\underline{4}$ in the short-circuit path for winding 3016 is closed, but the short circuit remains incomplete due to the shifting of the toggle contact 3088. As a result the SR$_3$ servo continues to remain free to move but in accordance with the input signal −E only. The servo motor moves and the extent of movement is noted by the student pilot at the indicator 3032. When the indicator 3032 registers 2300 r.p.m. the student pilot repositions the toggle lever 3042 to its center-off position reenergizing the master lever relay 3044 so that the SR$_3$ servo continues to remain free to move while it is now subject to the external inputs +RPM$_{ma}$ at the initial 2400 r.p.m., and −ΔN$_3$, now, as will be seen at −100 r.p.m., holding the SR$_3$ servo in the 2300 r.p.m. position in accordance with Equation 1.

Referring to Fig. 2, while the toggle lever 3042 had been placed in its decrease position, the short-circuit path for the ΔN$_3$ servo was opened due to the opening of the toggle contact 3116 so that the ΔN$_3$ servo moved substantially solely under the influence of the toggle voltage +E, the effect of the external signals to inputs +RPM$_{ma}$ and −SR$_3$ being negligible as explained. At the completion of toggling the ΔN$_3$ servo motor had moved to and was frozen in a +100 r.p.m. position as under sync. off-toggling. The external inputs +RPM$_{ma}$ and −SR$_3$ and the ±TOGGLE input are grounded once more as under usual synchronized operating conditions.

Referring to Fig. 3 and considering the two band limit servos concurrently, even though in accordance with the previous practice only the ΔS$_{2 \text{ or } 3}$ servo operation is described expressly, its +V$_{RPMma}$ input remained at 2400 r.p.m. as before toggling, whereas its −ΔN$_{2 \text{ or } 3}$ input remained at zero, the ΔN$_2$ engine having remained at the undeflected zero. On the other hand its −MaENG input had changed from 2400 r.p.m. to 2300 r.p.m., so that the ΔS$_{2 \text{ or } 3}$ servo deflects to −100 r.p.m. in accordance with Equation 3. Referring again to Fig. 1 and again considering the operation of the SR$_2$ servo as typical also of the SR$_4$ servo, the SR$_2$ servo is now subject to effective signal inputs of +ΔS$_2$ and +RPM$_{ma}$. The −ΔN input remains at zero as the ΔN$_2$ servo remains in its undeflected zero position. In view of the aforesaid limitations introduced by the contour of the potentiometer 2322, the +ΔS$_2$ input has not assumed a value of −100 r.p.m. but only of −80 r.p.m. so that the SR$_2$ servo assumes a final position of 2320 r.p.m. in accordance with Equation 1. The two slave engine systems may be resynchronized individually by individual sync. on-toggling as described immediately hereinafter or concurrently as described under the heading Resynchronization.

Considering the case of sync. on-toggling of a slave engine and more specifically the first combination in Table II: referring to Fig. 1 and again assuming initially usual synchronized operating conditions at 2400 r.p.m., with the shifting of the toggle lever 2042 to the decrease position the SR$_2$ servo and the ΔN$_2$ servo will behave much in the same manner as did the SR$_3$ servo and the ΔN$_3$ servo in the previous example in view of the fact that all but the ±TOGGLE input to the SR$_2$ servo are grounded. However the ΔN$_2$ servo with the release of the master lever relay 2044 attendant to toggling has its −ANS input still connected to the answer return but now through the NC contact $\underline{5}$ of the master lever relay 2044 and line 2106. Its +$\overline{\text{RPM}}_{ma}$ input remains returned to the voltage +V$_{RPMma}$ equivalent to 2400 r.p.m., but now through the NC contact $\underline{6}$ of the master lever relay 2044. The −SR$_2$ input remains returned to the slider 2112 of the speeder rack potentiometer 2114 but now through the NC contact $\underline{7}$ of master lever relay 2044 and line 2110. The ΔN$_2$ servo therefore remains subject to the input signals +RPM$_{ma}$ and −SR$_2$, but these input signals are negligible in comparison to the voltage +E applied to the ±TOGGLE input through the toggle contact 2108. The ΔN$_2$ servo with repositioning of the toggle lever 2042 in the off-position arrives at a position corresponding to +100 r.p.m. Referring to Fig. 3, the ΔS$_4$ servo remains at undeflected zero in accordance with Equation 3, as the −ΔN$_4$ servo input remains at zero and the +RPM$_{ma}$ and −MaENG inputs remain at 2400 and −2400 r.p.m. respectively. On the other hand the ΔS$_{2 \text{ or } 3}$ servo deflects to −100 r.p.m., for although its +RPM$_{ma}$ and −MaENG inputs also remain at +2400 and −2400 r.p.m. respectively, its −ΔN$_2$ input has now assumed a value corresponding to −100 r.p.m. When the toggle lever 2042 is restored to its center-off position, the No. 3 and No. 4 engine systems remain unaffected, the ΔN$_2$ servo is frozen at the position corresponding to +100 r.p.m., and the ΔS$_{2 \text{ or } 3}$ servo remains at the position corresponding to +100 r.p.m. as its −ΔN$_{2 \text{ or } 3}$ input remains fixed at −100 r.p.m. In accordance with Equation 1 the SR$_2$ servo will reposition itself according to the signals +RPM$_{ma}$ (2400 r.p.m.), −ΔN$_2$ (−100 r.p.m.) +ΔS$_2$. However +ΔS$_2$ is limited to +80 r.p.m. and does not attain the +100 r.p.m. of the ΔS$_{2 \text{ or } 3}$ servo for reasons previously stated, so that the final position of the SR$_2$ servo will be 2380 r.p.m. Had this servo been toggled to no less than 2320 r.p.m. it would have reverted to synchronism. To restore synchronism the No. 2 engine may be toggled with synchronization on in the manner above described, or it may be resynchronized as described immediately hereinafter.

RESYNCHRONIZATION

The starting point for the resynchronization operation presupposes that one or both slave engines are out of synchronism with the master engine, say at 2320 r.p.m. or 2380 r.p.m. whereas the master engine is at 2300 r.p.m. or 2400 r.p.m., these effects being due to toggling as described in the examples under sync. off-toggling and sync. on-toggling. The circuit conditions may be assumed to be the same as at the end of sync. on-toggling of the master engine (the first combination of Table I which will be specifically described). Under this assumption the No. 2 and No. 4 engine servo systems will operate in analogous manner concurrently; except for the initial speed of 2320 r.p.m. and the final speed of 2300 r.p.m. as opposed to an initial speed of 2380 r.p.m. and a final speed of 2400 r.p.m. and also except for some possible sign reversals in the r.p.m. values, the description applies to the first combination of Table II as well, but only insofar as the No. 2 engine is concerned, as the No. 4 engine system in such case had been in synchronism throughout and remains substantially unaffected. The resynchronizing relay 4304 in such case is not ever energized and the follow-up relay 4302 is not ever deenergized, as the $\Delta S_4$ servo remains at undeflected zero (Fig. 5).

The student pilot, noting that the indicators 2032 and 4032 register 2320 r.p.m. whereas the other indicator 3032 registers 2300 r.p.m. (Fig. 1), depresses the resynchronizing button 34 (Fig. 5), thereby closing the energization circuit for the resynchronizing relays 2304 and 4304. The effects thereof will be described explicitly for the engine No. 2 system and will be recognized also to apply to the engine No. 4 system by correspondence of the reference numerals. The energization circuit for relay 2304 extends from the +E(D.C.) line 15 through the relay coil, through the NO contact 1 of the resynchronizing button 34, through the NO contact 1 of usually energized synchronizing relay 30, line 2316, through the off-center portions of potentiometer 2308 to the grounded slider 2314, which with the $\Delta S_{2\text{ or }3}$ servo in a position corresponding to −100 r.p.m. is engaging the off-center portion of the potentiometer at a position corresponding to −100 r.p.m. The resynchronizing button may be depressed momentarily by the student pilot or it may be depressed continuously; either way the results will be the same as will be apparent hereinafter. Upon depressing of the resynchronizing button, the resynchronizing relay 2304 picks up and a hold circuit therefor is established as its NO contact 1 and line 2318 now shunt the NO contact 1 of the resynchronizing button 34. With the energization of the resynchronizing relay 2304 the follow-up relay 2302 is deenergized for its main energization path is opened with the slider 2314 in an off-center position, whereas its hold circuit is opened due to the opening of the NC contact 2 of the resynchronizing relay 2304.

Referring to Fig. 3 with the release of the follow-up relay 2302 the inputs +RPM$_{\text{ma}}$ and −$\Delta N_{2\text{ or }3}$ of the $\Delta S_{2\text{ or }3}$ servo are grounded respectively through the NC contacts 4 and 5 of the follow-up relay 2302, whereas its −M$a$ENG input is returned to the supplemental band limit servo answer return over the NC contact 6 of relay 2302. Its −ANS input is permanently connected to the main band limit servo answer return. As a result the $\Delta S_{2\text{ or }3}$ servo runs down rapidly to the undeflected zero position as previously discussed. Referring again to Fig. 5 when the servo arrives at the undeflected zero position the energization circuit for the resynchronizing relay is opened again with the slider 2314 engaging the central portion 2312 of the potentiometer 2308 once more.

If the resynchronizing button 34 had been depressed but momentarily, the follow-up relay 2302 will be reenergized and its hold circuit through its grounded NO contact 1 will be reestablished. Referring to Fig. 1 while the follow-up relay 2302 is deenergized the short-circuit path for the control winding of the No. 2 engine operating as a slave engine is completed through the NC contact 3 of the follow- up relay and the NC contact 5 of master engine relay 17; conversely had the No. 3 engine been operating as the slave engine the short-circuit path for its control winding would have been completed through the NC contact 2 of the follow-up relay and the NO contact 4 of the master engine relay 17. The control winding of the master engine (herein winding 3016) remains non-short-circuited due to open state of the appropriate contact of the master engine relay 17. The slave engine speeder rack servo (herein SR$_2$) remains frozen in its 2320 r.p.m. position until the follow-up relay 2302 releases once more. Referring to Fig. 2 the energization of the resynchronizing relay opens the short-circuit path of the $\Delta N_2$ servo as its NC contact 4 is now open. Had the No. 3 engine been selected as slave engine, the short circuit path for the $\Delta N_3$ servo prior to the energization of the resynchronizing relay would have been complete through the NO contact 12 of the master engine relay 17 and through the NC contact 3 of the resynchronizing relay, but would now be opened upon the energization of the latter due to the opening of such NC contact 3. At the same time the short circuit path for the winding 2098 of the $\Delta N_2$ servo would have been complete before and after energization of the resynchronizing relay 2304 through the NO contact 13 of the master engine relay 17.

Reverting to the consideration of the first combination in Table I, the $\Delta N_2$ servo is free to move during the period of energization of the resynchronizing relay 2304 and to assume a position of +80 r.p.m. in accordance with Equation 2, i.e. according to the input signals +RPM$_{\text{ma}}$ (2400 r.p.m.) and −SR$_2$ (−2320 r.p.m.), the SR$_2$ servo being frozen at the position of 2320 r.p.m. as explained. Assuming that the resynchronizing button has been depressed but momentarily, when the $\Delta S_{2\text{ or }3}$ reverts to its undeflected zero position its inputs +RPM$_{\text{ma}}$, −$\Delta N_{2\text{ or }3}$ and −M$a$ENG become subject once more to effective external signals. At the same time the $\Delta N_2$ servo is frozen in the position of +80 r.p.m., as the resynchronizing relay 2304 is deenergized once more. The $\Delta S_{2\text{ or }3}$ servo in accordance with Equation 3 moves beyond the undeflected zero to a final position of −20 r.p.m. Referring now to Fig. 1, the release of the follow-up relay 2302 opened up the short circuit path for the winding 2016 once more so that the SR$_2$ servo became free to move once more as controlled by the input signals +$\Delta S_2$, +RPM$_{\text{ma}}$ and −$\Delta N_2$. By substitution in Equation 1 it is seen that the SR$_2$ servo is positioned in the 2300 r.p.m. position so that the indicator 2032 registers 2300 r.p.m. synchronous speed.

Although synchronous speed has been reattained, the band limit servos are now in a position of −20 r.p.m. If the master engine were now sync. on-toggled from 2300 r.p.m. to 2400 r.p.m., the slave engines would fully follow the master engine, as the sliders 2320 and 4320 of potentiometer cards 2322 and 4322 respectively (Fig. 1) could move first the +20 r.p.m. required to reach the undeflected zero position of the band limit servos, and thereafter an additional +80 r.p.m., i.e. to the limits of potentiometers 2322 and 4322. On the other hand were the master engine toggled down to 2200 r.p.m., the slave engines would attain a final speed of only 2240 r.p.m. as the slider 2320 would move from an initial −20 r.p.m. to a final position corresponding to only −80 r.p.m. It is desirable that the band limits of the slave engines be properly centered after they have been resynchronized, so that the slave servos could follow the master servo ±80 r.p.m. were the master servo toggled once more.

To this end, in the trainer as in the actual aircraft, the student pilot is of course required to depress the resynchronizing button a second time, even after synchronism has been restored. Assuming he does so again momentarily only, the follow-up relays are once more deenergized and the resynchronizing relays are once more energized. The slave speeder rack servos are frozen at the synchronous speed of 2300 r.p.m., whereas the slave toggle servos run to +100 r.p.m. in accordance with Equation 2. The band limit servos answer themselves back to undeflected zero position as before with the resultant reenergization of the follow-up relays and the deenergization of the resynchronizing relays. The slave toggle servos are frozen at +100 r.p.m., so that the band limit servos now become subject to the signals +RPM$_{\text{ma}}$ (2400 r.p.m.), −$\Delta N$ (−100 r.p.m.) and −M$a$ENG (−2300 r.p.m.) and therefore stay at the undeflected zero position in accordance with Equation 3. The slave speeder rack servos are freed for movement again but remain at 2300 r.p.m. as may be determined by substitution in Equation 1.

Still considering the description of the engine No. 4 concurrently by implication: Assuming that the student pilot has depressed the resynchronizing button continuously, at the time that the $\Delta S_{2 \text{ or } 3}$ servo assumed its undeflected zero position for the first of the two times during resynchronization the resynchronizing relay 2304 would be deenergized but the follow-up relay 2302 would remain deenergized as its main energizing circuit through line 2306 (Fig. 5) would remain open with the NC contact 2 of the resynchronizing button still being open; therefore the relay would have been unable to "hold" itself in through its grounded NO contact 1. The control winding 2016 of the $SR_2$ servo would have remained short circuited so that this servo would have continued at a 2320 r.p.m. position. The $\Delta N_2$ servo control winding 2098 would have its short circuit remaining open with the deenergization of the resynchronizing relay with the servo in the +80 r.p.m. position as before. The $\Delta S_{2 \text{ or } 3}$ servo would have remained at the undeflected zero position with the follow-up relay 2302 still deenergized. The student pilot would have noted that the indicator 2032 still registered 2320 r.p.m. He would then release the resynchronizing button 34 whereupon the servos would assume positions corresponding to those in the previous example with the resynchronizing button depressed but momentarily. Thereafter the student pilot would depress the resynchronizing button once more to recenter the band limits for the slave engines. He may do so momentarily or continuously with the same results obtained as upon the second depressing in the first example.

With the description of resynchronization completed, there remains the description of operation of engine seizure or failure.

ENGINE SEIZURE OR FAILURE

The starting point for conditions of engine seizure or engine failure are the usual synchronized operating conditions. Single descriptions of master engine failure and slave engine failure will be presented. Assuming again that the number 3 engine is the master engine and that a simulated engine failure is introduced to the input of the RPM No. 3 servo over line 3034 or that engine seizure energization is applied to the relay 3028 (Fig. 1), the RPM No. 3 servo will run down to 400 r.p.m. or possibly to zero. Referring to Fig. 4, the cam 3056 operated by the No. 3 RPM servo disconnects the contact 3052 from the line 3054 connected to the +E (D.C.) line 15, deenergizing the synchronizing relay 30. Referring to Fig. 2, the $-\Delta NS$, $+RPM_{ma}$ and $-SR_3$ inputs of the $\Delta N_3$ servo had been and remained grounded respectively through the NC contacts 6, 7 and 8 of the master engine relay 17. The corresponding inputs to the slave engine toggle servos now also are grounded, however through respective NC contacts of the now deenergized synchronizing relay 30. The single description applicable to the No. 2 engine servo system will be applicable to the other slave engine system (No. 4) as well, referring to the corresponding reference numerals of the No. 4 engine system. The $-\Delta NS$, $+RPM_{ma}$ and $-SR_2$ inputs to the $\Delta N_2$ servo amplifier 2096 are grounded through respectively the NC contacts 6, 7 and 8 of the now deenergized synchronizing relay 30. The $\Delta N_2$ servo will remain at the undeflected zero position because its control winding 2098 remains short circuited as before. Referring to Fig. 3 with the release of the synchronizing relay 30, the $+RPM_{ma}$, $-\Delta N_{2 \text{ or } 3}$ and $-MaENG$ inputs of the $\Delta S_{2 \text{ or } 3}$ servo are grounded respectively through the NC contacts 12, 13 and 14 of the synchronizing relay 30. At the same time the winding 2332 of the $\Delta S_{2 \text{ or } 3}$ servo is short circuited through the NC contact 18 of the synchronizing relay 30 at the undeflected zero position, whereas referring to Fig. 1, the inputs to and the non-short circuited conditions of the control windings of the speeder rack servos remain unchanged. However, it should be recalled that the $-\Delta N$ inputs to the speeder rack servos are now permanent at undeflected zero. If the student pilot now positions the master r.p.m. control 12 in some other position (but not the 2800 r.p.m. calibrate position), the $SR_3$ servo will move to such position, but the indicator 3032 will continue to register its low reading. The other speeder rack servos will now assume the required new positions and their indicators will correctly register the desired speed. The three toggle servos ($\Delta N$) will experience no change in input signal, as their inputs are grounded through respective contacts of the deenergized synchronizing relay 30 (slave engines) and of master engine relay 17 (master engine), whereas their short circuit windings remain short circuited. The band limit servos will remain in the undeflected zero positions because their respective inputs are grounded through the NC contacts of the synchronizing relay 30 whereas their windings are short circuited through contacts of the same relay.

If the master engine is toggled (with the synchronization switch in the No. 3 on position), the $SR_3$ servo will assume the corresponding new position, but the No. 3 engine will nevertheless remain at the low speed. At the same time during toggling the short circuit for the $\Delta N_3$ servo is opened and the servo moves until the toggle lever 3042 is released once more, whence it is frozen at the then assumed position. The $\Delta S_{2 \text{ or } 3}$ servo and also the $\Delta S_4$ servo remain at the undeflected zero positions, as their windings remain short circuited because of the deenergization of the synchronizing relay 30. When the toggle lever 3042 is repositioned to the off-position, the $SR_3$ engine is held at the new position in accordance with the changed $-\Delta N_3$ input. The low reading of indicator 3032 continues. The slave engine speeder rack servos remain at the initial positions as before master engine toggling, as their $-\Delta N$ and $+\Delta S$ inputs remained at undeflected zero. The slave engines may be toggled individually; the results are substantially the same as previously except for the band limit servos. These remain at undeflected zero and have therefore no influence on the speeder rack servos. An important effect of master engine failure is therefore the loss of control of the slave engines by master engine toggling.

Referring to Fig. 5 depressing of the resynchronizing button 34 will have no effect whatsoever as the energization paths for the resynchronizing relays are permanently open with the deenergization of the synchronizing relay 30. As a result the follow-up relays will remain energized. Another important result of master engine failure is then the inability to respond to attempted resynchronization by means of depressing the resynchronizing button. If the other slave engine is to be brought into synchronism it must be toggled to the required speed, or the synchronizing switch 14 must be positioned to the alternate No. 2 master engine position whereupon the No. 4 engine will assume the speed of the No. 2 engine unless limited by the band limit servo, in which case the resynchronizing button must be depressed as before.

In the event a slave engine, say the No. 2 engine experiences engine seizure or engine failure, the synchronizing relay 30 is not deenergized and the No. 3 and No. 4 engine systems are operable in the manner previously described. In the absence of toggling the $\Delta N_2$ control winding 3098 will remain short circuited at undeflected zero, whereas the $\Delta S_{2 \text{ or } 3}$ servo will receive its usual inputs and remain at undeflected zero even through the master r.p.m. control 12 is shifted in position as under usual synchronized operating conditions. As a result the $SR_2$ servo will continue to respond in unison with the other speeder rack servos with such shifting position of the master r.p.m. control 12, but the indicator 2032 will continue to register a low reading owing to engine seizure or failure. If the master engine is sync. on-toggled the No. 4 engine will follow the master engine except as band limited, and the servos of the number 2 engine will behave similarly, i.e. just as in the case of the toggling operation with the No. 2 engine fully effective, except of course that the engine itself will run at a low speed as reflected by the reading of the indicator 2032. The previous results obtained in the case of toggling the No. 4 engine also holds true, i.e. at the completion of toggling both the No. 2 and No. 3 servos will revert to master engine speed except as band limited. The same result is obtained if the No. 2 engine system is toggled individually, this engine reverting to the synchronous speed of the master engine except as band limited. Moreover in each of these instances the slave systems may be resynchronized by depressing the resynchronizing button 34. However the No. 2 engine will remain at the low speed as reflected by the indicator 2032 owing to the engine seizure or failure.

The several modes of operation of the apparatus having been described individually, by superposition of effects other modes, for example simultaneous toggling of two engines, may be readily ascertained. In regard to resynchronization, the examples presented were such that the first actuation of the resynchronizing button restored synchronism. Where the absolute value of the difference between master engine speed and slave engine speed exceeds 80 r.p.m., one or more additional actuations will be required to resynchronize, depending on the value of the next highest multiple of 80 r.p.m. including the initial difference. Upon resynchronization it is necessary to actuate the resynchronizing button once more to recenter the band limit. The structure of the No. 1 engine system is identical to that of the No. 4 engine system; accordingly the operations of these two systems are the same, except of course for the cases where the No. 4 engine operates purely individually, as in the case of toggling. In such case the No. 1 engine system behaves in a manner analogous to the remaining slave engine system. If the No. 1 engine system is subjected to individual operation, for example toggling, it operates in a manner analogous to that described for an individually operated slave engine.

It should be understood that this invention is not limited to specific details of construction and arrangement thereof herein illustrated, and that changes and modifications may occur to one skilled in the art without departing from the spirit of the invention.

What is claimed is:

1. An aircraft propeller simulating system comprising a simulated master r.p.m. control that is positionable over a range of positions such that any given position corresponds to a predetermined desired operating r.p.m. of said system, a plurality of speeder rack positioning servos for simulating operation of means for adjusting engine governors to control engine r.p.m., means controlled by said simulated r.p.m. control for positioning each of said speeder rack servos to a position that represents the r.p.m. corresponding to the instant position of said master control, other means for separately controlling each of said servos, a synchronizing control, means for selecting one of said servos as a master servo in one position of said synchronizing control and another of said servos as a master servo in another position of said synchronizing control, means for controlling the other servos to follow changes within predetermined limits in the master servo, means for resynchronizing said other servos with the master in the event said other servos and said master are out of synchronization, means for calibrating the positioning servos to line up said servos according to the position of the master r.p.m. control, an r.p.m. servo operatively connected with each positioning servo, an indicator operatively connected with each said r.p.m. servo to register simulated r.p.m., and maximum and minimum r.p.m. indicating means for each positioning servo operated in extreme positions of the respective positioning servo.

2. An aircraft propeller simulating system comprising a simulated master lever control that is positionable over a range of positions such that any given position corresponds to a predetermined desired operating r.p.m. of said system, master engine and slave engine speeder rack servos for simulating operation of means for adjusting engine governors to control engine speed, a master engine simulated toggle lever, a slave engine band limit servo, means for positioning each of said speeder rack servos to a position that represents the r.p.m. corresponding to the instant position of said master control and also determinative of the position of said band limit servo, means controlled according to the position of said master engine speeder rack servo for normally balancing the control effect on said band limit servo by said master lever controlled means to maintain said band limit servo usually in a neutral position, toggling means rendered responsive upon operation of said toggle lever to effect a change in position of said master engine speeder rack servo from the position determined in accordance with said master lever control and also to deflect said band limit servo from said neutral position due to upsetting of said balance, and means operable according to the position of said band limit servo for additionally controlling the position of said slave engine speeder rack servo within predetermined limits within said range to cause said slave speeder rack servo to follow said master engine speeder rack servo to at most said limits.

3. The combination as defined in claim 2 further provided with calibrating means controlled by the master lever control for repositioning the speeder rack servos in a position in accordance with the position of said master lever control, and for reverting the band limit servo to its neutral position.

4. The combination as defined in claim 2 further provided with resynchronizing means for causing the band limit servo to move in the direction towards its neutral position thereby to cause the additional slave engine speeder rack servo control means to control the slave speeder rack servo for motion in the direction towards the position corresponding to that of the master engine speeder rack servo.

5. The combination as defined in claim 2 with the addition of a synchronizing switch usually in an on-position and positionable to an off-position, means operable on switching said synchronizing switch to the off-position to lock the speeder rack servos and the band limit servo in position thereby effectively to remove further control by the band limit servo of the slave engine speeder rack servo, a simulated slave engine toggling switch, slave engine toggling means rendered responsive upon operation of said slave engine toggling switch to unlock the slave engine speeder rack servo and to effect a change in its position and upon completion of the toggling operation once again to lock it in position, the master engine toggling means also being effective to unlock the master engine speeder rack servo and to effect a change in its position and upon completion of the toggling operation once again to lock it in position.

6. The combination as defined in claim 2 with the addition of instructor controlled means for simulating synchronization failure, means effective on operation of said synchronization failure means to lock the speeder rack servos and the band limit servo in position thereby effectively to remove further control by the band limit servo of the slave engine speeder rack servo, a simulated slave engine toggling switch, slave engine toggling means rendered responsive upon operation of said slave engine toggling switch to unlock the slave engine speeder rack servo and to effect a change in its position and upon completion of the toggling operation once again to lock it in position, the master engine toggling means also being effective to unlock the master engine speeder rack servo and to effect a change in its position and upon completion of the toggling operation once again to lock it in position.

7. The combination as defined in claim 2 with the addition of instructor controlled means for simulating sudden run-down of the master engine, means rendered responsive upon operation of said run-down means to lock the band limit servo in position whereby the additional means for controlling the position of the slave engine speeder rack servo is precluded from effecting change in position of the slave engine speeder rack servo.

8. The combination as defined in claim 2 further provided with a master engine toggle servo usually locked in a neutral position, and wherein the toggling means when rendered responsive to the operation of the toggle lever is effective also to unlock said toggle servo and to deflect it from its neutral position, and with the addition of means for locking said toggle servo at the completion of toggling in its new position, and means operable in accordance with the position of said toggle servo for additionally controlling the master engine speeder rack servo to maintain it in its new position upon completion of the toggling operation.

9. The combination as defined in claim 8 with the addition of calibrating means for reverting both speeder rack servos to a position in accordance with the position of the master lever control, for reverting the band limit servo to its neutral position, and for also reverting the toggle servo to its neutral position and locking it thereat.

10. The combination as defined in claim 8 with the addition of a slave engine simulated toggle switch, a slave engine toggle servo normally locked in a neutral position, slave engine toggling means rendered responsive upon operation of said slave engine toggling switch to unlock the slave engine toggle servo and to effect changes in position respectively of the slave engine speeder rack and toggle servos, means for locking said slave engine toggle servo in its new position upon completion of the toggling operation, means operable in accordance with the position of the slave engine toggle servo for additionally controlling the position of the band limit servo, whereby upon completion of the toggling operation the slave engine speeder rack servo follows the master engine speeder rack servo back at most up to the aforesaid limits.

11. The combination as defined in claim 10 with the addition of calibrating means controlled by the master lever control for repositioning the speeder rack servos in accordance with the position of said control, for reverting the toggle servos to the neutral position and for reverting the band limit servo to its neutral position.

12. The combination as defined in claim 10 further provided with means for positioning the slave engine toggle servo also in accordance with the position of the slave engine speeder rack servo, resynchronizing means operable to simultaneously momentarily lock the slave engine speeder rack servo in position and unlock the slave engine toggle servo thereby to cause the first-mentioned means for positioning the slave toggle servo to effect a change in position of the slave toggle servo corresponding to the locked slave speeder rack servo position, said resynchronizing means also being effective to move the band limit servo to its neutral position, means responsive to attainment by the band limit servo of its neutral position for once again locking said slave engine toggle servo and for unlocking said slave engine speeder rack servo thereby to cause the band limit servo controlled means for positioning the slave speeder rack servo to effect movement of said slave speeder rack servo to a position corresponding to that of master engine speeder rack servo except as limited by the band limiting means, the movement of the slave engine speeder rack servo effecting a change in position of the band limit servo beyond its neutral position just attained in accordance with the new position of the slave speeder rack servo and the new locked position of the slave toggle servo.

13. An aircraft propeller simulating system comprising a simulated master r.p.m. control that is positionable over a range of positions such that any given position corresponds to a predetermined desired operating r.p.m. of said system, a plurality of speeder rack positioning servos for simulating the operation of means for adjusting engine governors to control engine r.p.m., means controlled by said simulated r.p.m. control for positioning each of said speeder rack servos to a position that represents the r.p.m. corresponding to the instant position of said master control, other means for separately controlling each of said servos, a synchronizing control, means for selecting one of said servos as a master servo in one position of said synchronizing control and another of said servos as a master servo in another position of said synchronizing control, means for controlling the other servos to follow changes within predetermined limits in said master servo, means for resynchronizing said other servos with the master in the event said other servos and said master are out of synchronization, and means for calibrating the positioning servos to line up said servos according to the master r.p.m. control position.

14. The combination as defined in claim 13 with the addition of an r.p.m. servo operatively connected with each of said positioning servos, and an indicator operatively connected with each r.p.m. servo to register simulated r.p.m.

15. An aircraft propeller simulating system comprising a simulated master lever control that is positionable over a range of positions such that any given position corresponds to a predetermined desired operating r.p.m. of said system, a plurality of speeder rack servos, means controlled by said simulated master lever control for positioning each of said speeder rack servos to a position that represents the r.p.m. corresponding to the instant position of said master control, toggling means for separately controlling each such servo, a synchronizing switch for selecting one of said speeder rack servos as a master for the other speeder rack servos to follow, a band limiting servo for each of the follower speeder rack servos, means operatively connected with each band limiting servo and a follower speeder rack servo whereby the follower speeder rack servo follows changes in said master servo only within predetermined limits, a resynchronizing control, a toggle servo for each follower speeder rack servo responsive to operation of said resynchronizing control for determining the change in position of the follower speeder rack servo occasioned by a change in the position of the master speeder rack servo, each said band limiting servo being positioned upon operation of the resynchronizing control according to the difference in positions assumed by the corresponding follower speeder rack servo and the master speeder rack servo following a change in the master speeder rack servo position, means for providing the follower speeder rack servos with input signals upon operation of the resynchronizing control according to the positions assumed by said toggle and band limiting servos for resynchronizing the follower speeder rack servos with the master speeder rack servo in the event the master and follower speeder rack servos are out of synchronization, calibrating means operatively controlled by said master lever control and connected with said speeder rack servos for overriding the effect of said toggling means for controlling the speeder rack servos to line up the speeder rack servos according to the master lever control position, an r.p.m. servo operatively connected with each of said speeder rack servos, and an indicator controlled by each said r.p.m. servo to register simulated r.p.m.

16. The combination as defined in claim 15 with the addition of maximum and minimum r.p.m. indicating means for each speeder rack servo operated in extreme positions of the respective servo.

17. An aircraft propeller simulating system comprising a simulated master lever control that is positionable over a range of positions such that any given position corresponds to a predetermined desired operating r.p.m. of said system, a plurality of speeder rack servos, means controlled by said simulated master lever control for positioning each of said speeder rack servos to a position that represents the r.p.m. corresponding to the instant position of said master control, toggling means for separately controlling each such servo, a synchronizing switch for selecting one of said speeder rack servos as a master for the other speeder rack servos to follow, a band limiting servo for each of the follower speeder rack servos, means operatively connected with each band limiting servo and a follower speeder rack servo whereby the follower speeder rack servo follows changes in said master servo only within predetermined limits, a resynchronizing control, a toggle servo for each follower speeder rack servo responsive to operation of said resynchronizing control for determining the change in position of the follower speeder rack servo occasioned by a change in the position of the master speeder rack servo, each said band limiting servo being positioned upon operation of the resynchronizing control according to the difference in positions assumed by the corresponding follower speeder rack servo and the master speeder rack servo following a change in the master speeder rack servo position, and means for providing the follower speeder rack servos with input signals upon operation of the resynchronizing control according to the positions assumed by said toggle and band limiting servos for resynchronizing the follower speeder rack servos with the master speeder rack servo in the event the master and follower speeder rack servos are out of synchronization.

References Cited in the file of this patent

UNITED STATES PATENTS

| | | |
|---|---|---|
| 2,400,579 | Wahlberg | May 21, 1946 |
| 2,400,580 | Wahlberg | May 21, 1946 |
| 2,584,261 | Davis et al. | Feb. 5, 1952 |
| 2,593,484 | Philpott | Apr. 26, 1952 |
| 2,694,170 | Brown | Nov. 9, 1954 |
| 2,696,269 | Chilman | Dec. 7, 1954 |
| 2,788,589 | Stern | Apr. 16, 1957 |